(12) United States Patent
Praveen et al.

(10) Patent No.: US 12,545,354 B2
(45) Date of Patent: Feb. 10, 2026

(54) CARGO-CARRYING WHEELED VEHICLE

(71) Applicants: Vijay K Praveen, Bangalore (IN); Alok Das, Pune (IN)

(72) Inventors: Vijay K Praveen, Bangalore (IN); Alok Das, Pune (IN); Lakshmish Gangadhar, Bangalore (IN); Nitin Ranade, Pune (IN)

(73) Assignees: Vijay K Praveen, Bangalore (IN); Alok Das, Pune (IN)

( * ) Notice: Subject to any disclaimer, the term of this patent is extended or adjusted under 35 U.S.C. 154(b) by 902 days.

(21) Appl. No.: 17/598,907

(22) PCT Filed: Apr. 3, 2020

(86) PCT No.: PCT/IN2020/050327
§ 371 (c)(1),
(2) Date: Sep. 28, 2021

(87) PCT Pub. No.: WO2020/202218
PCT Pub. Date: Oct. 8, 2020

(65) Prior Publication Data
US 2022/0161885 A1    May 26, 2022

(51) Int. Cl.
*B62K 7/04*    (2006.01)
*B62H 1/02*    (2006.01)
(Continued)

(52) U.S. Cl.
CPC ............... *B62K 7/04* (2013.01); *B62H 1/02* (2013.01); *B62J 1/08* (2013.01); *B62J 1/12* (2013.01);
(Continued)

(58) Field of Classification Search
CPC .......... B62J 43/16; B62J 43/20; B62K 25/283
(Continued)

(56) References Cited

U.S. PATENT DOCUMENTS

| | | | |
|---|---|---|---|
| 2008/0157557 A1* | 7/2008 | Endo | .................... B62J 1/12 |
| | | | 296/65.03 |
| 2013/0048401 A1* | 2/2013 | Kim | ..................... B62J 43/28 |
| | | | 280/638 |

FOREIGN PATENT DOCUMENTS

WO    2018225084 A1    12/2018

OTHER PUBLICATIONS

TechCrunch, "Lit Motors Kubo Cargo Scooter | CES 2014," YouTube, published Jan. 9, 2014, available at: https://www.youtube.com/watch?v=MqTgQIKtlyA (Year: 2014).*

(Continued)

*Primary Examiner* — Christopher B Wehrly
(74) *Attorney, Agent, or Firm* — Jose Cherson Weissbrot

(57) ABSTRACT

A cargo-carrying wheeled vehicle comprising: at least a cargo hold chassis (10); at least a battery support chassis (30) configured to be operatively behind or operatively ahead or operatively underneath said cargo hold chassis (10); and at least a rider and pillion support chassis (20) configured to be operatively behind said battery support chassis (30) and operatively behind said cargo hold chassis (10), in that, said cargo hold chassis (10), said battery support chassis (30), and said rider and pillion support chassis (20) cooperate to maintain centre of gravity of said vehicle, after addition of cargo and rider and pillion, relatively lower (closer to ground) and substantially on or very near to the centerline of the wheelbase of this vehicle (between 10*a* and 12*a*).

12 Claims, 26 Drawing Sheets

(51) Int. Cl.
    *B62J 1/08*       (2006.01)
    *B62J 1/12*       (2006.01)
    *B62J 9/14*       (2020.01)
    *B62J 43/16*     (2020.01)
    *B62J 43/20*     (2020.01)
    *B62K 11/04*     (2006.01)
    *B62K 21/12*     (2006.01)
    *B62K 25/28*     (2006.01)

(52) U.S. Cl.
    CPC ................ *B62J 9/14* (2020.02); *B62J 43/16* (2020.02); *B62J 43/20* (2020.02); *B62K 11/04* (2013.01); *B62K 21/12* (2013.01); *B62K 25/283* (2013.01); *B62K 2204/00* (2013.01)

(58) Field of Classification Search
    USPC ........................................................ 280/202
    See application file for complete search history.

(56) References Cited

OTHER PUBLICATIONS

Peter Hallberg, "CEP—Steer-by-wire Cargo Bike," YouTube, published Feb. 28, 2017, available at: https://www.youtube.com/watch?v=AfBUvL-t1HE (Year: 2017).*

* cited by examiner

ND VEHICLE

FIELD OF THE INVENTION

This invention relates to the field of automobiles.
Particularly, this invention relates to a cargo-carrying wheeled vehicle.

BACKGROUND OF THE INVENTION

Freight bicycles, carrier cycles, freight tricycles, cargo bikes, box bikes, or cycle-trucks are human powered vehicles designed and constructed specifically for transporting loads.

Prior art vehicle designs include a cargo area consisting of an open or enclosed box, a flat platform, or a wire basket, usually mounted over one or both wheels, low behind the front wheel, or between parallel wheels at either the front or rear of the vehicle. Typically, this cargo area is randomly placed and does not work well with the vehicle's maneuverability since a variety of moments act on these randomly aligned vehicles; especially while taking turns, causing dangerous as well as difficult maneuvers.

Freight bikes are used in a variety of settings:
Delivery services in dense urban environments;
Food vending in high foot traffic areas (including specialist ice cream bikes);
Transporting trade tools, including around large installations such as power stations and CERN;
Airport cargo handling;
Recycling collections;
Warehouse inventory transportation;
Mail delivery.

These freight bikes are human powered and cannot be used for carrying heavy weight and are also slow due to human effort needed.

Also in all the above examples, the Loading is carried out at higher location, thereby shifting the CG higher which impacts the handling and dynamics of the vehicle.

Furthermore, in all prior art two-wheeled vehicles, there is no dedicated cargo compartment for carrying load. Even if there is, in one type of modified two-wheeled vehicles, the load is at a relatively higher location when considered with the natural centre of gravity of the vehicle (without the modification to carry load), which effectively raises the centre of gravity to a dangerous height making the vehicle (when loaded with rider and load) wobbly and difficult to balance and steer. Additionally, if the load/cargo is kept behind the rider, it almost always rests against the back of the rider, thereby restricting backward movement (lack of ergonomics) of the rider and causing tremendous strain on the rider's back. In another type of modified two-wheeled vehicles, the load is at an operative forward location when compared with the rider. This effectively moves the centre of gravity way too ahead with respect to a rider and with respect to the entire loaded vehicles, as a whole, making maneuverability difficult. It is, therefore, important that the centre of gravity be located within a defined zone such that there is no wobbling or misbalancing of the vehicle when it is being ridden, there is ample space for a rider to move his or her body to adjust centre of gravity when riding the vehicle, there is ease of maneuverability, there is no learning curve, and the like.

Therefore, there is a need for a vehicle or a class of vehicle to make cargo carrying, especially, at last mile, easy and efficient, such vehicle or class of vehicle, preferably, being a two-wheeler vehicle.

OBJECTS OF THE INVENTION

An object of the invention is to overcome the current problems involved in freight bikes or cargo scooters.

Another object of the invention is to provide a frame for a cargo scooter which also acts as a load carrying space.

Yet another object of the invention is to maximize the utilization of storage compartment in a freight bike or a cargo scooter.

Still another object of the invention is to provide modularity in the storage compartment, providing channels for installing drawers, in a freight bike or a cargo scooter.

An additional object of the invention is to provide ease of handling of freight bikes or cargo scooters even whilst having a large load carrying space.

Another additional object of the invention is to provide easily manoeuvrable freight bikes or cargo scooters even whilst having a large load carrying space.

Yet another object of the invention is to provide a rather stable freight bikes or cargo scooters even whilst having a large load carrying space.

SUMMARY OF THE INVENTION

According to this invention, there is provided a cargo-carrying wheeled vehicle comprising:
- at least a cargo hold chassis;
- at least a battery support chassis configured to be operatively behind or operatively ahead or operatively underneath said cargo hold chassis; and
- at least a rider and pillion support chassis configured to be operatively behind said battery support chassis and operatively behind said cargo hold chassis, in that, said cargo hold chassis, said battery support chassis, and said rider and pillion support chassis cooperate to maintain centre of gravity of said vehicle, after addition of cargo and rider and pillion, relatively lower (closer to ground) and substantially on or very near to the centerline of the wheelbase of this vehicle;
- wherein, an operative spaced apart distance between a centre of gravity of cargo in said cargo hold chassis and a centre of gravity of battery in said battery support chassis is defined by a first locus of points which lie within a first value and a second value, said first value being equal to zero times the wheelbase of said vehicle and said second value being half the wheelbase of said vehicle;
- wherein, an operative spaced apart distance between a centre of gravity of battery in said battery support chassis and a centre of gravity of rider and pillion on said rider and pillion support chassis is defined by a second locus of points which lie within a third value and a fourth value, said third value being equal to zero times the wheelbase of said vehicle and said fourth value being nine-tenths the wheelbase of said vehicle;
- wherein, an operative spaced apart distance between a centre of gravity of cargo in said cargo hold chassis and a centre of gravity of rider and pillion on said rider and pillion support chassis is defined by a third locus of points which lie within a fifth value and a sixth value, said fifth value being equal to zero times the wheelbase of said vehicle and said sixth value being nine-tenths the wheelbase of said vehicle;
- wherein, a combined centre of gravity being formed by a centre of gravity of said cargo in said cargo hold chassis, a centre of gravity of said battery in said battery support chassis, a centre of gravity of said rider and pillion on said rider and pillion support chassis, characterised in that, said combined centre of gravity being defined by a fourth locus of points which lie within a seventh value and an eighth value, said seventh value being equal to half the wheelbase of said vehicle added to one-third the wheelbase of said vehicle and said eighth value being equal to one-third the wheelbase of said vehicle subtracted from half the wheelbase of said vehicle; and said combined centre of gravity being defined by a fifth locus of points which lie within a ninth value and a tenth value, said ninth value being equal to radius of a wheel of said vehicle and said tenth value being equal to a value defined by radius of a wheel of said vehicle added to one-third of the wheelbase of said vehicle.

In at least an embodiment, a footrest for a rider to rest their feet being positioned extending from said vehicle at a distance from a centre of said wheelbase, said distance being defined by a value with a tolerance range of one-third said wheelbase added to or subtracted from said wheelbase.

In at least an embodiment, said cargo hold chassis being integral with said battery support chassis.

In at least an embodiment, said cargo hold chassis being located operatively forward and operatively lower with respect to said rider and pillion support chassis.

In at least an embodiment, said cargo hold chassis comprises a structural framework with at least a lateral support member (i.e. front and back support member) along with an operative top support member and an operative bottom support member to form a contoured space to hold cargo.

In at least an embodiment, said cargo hold chassis is communicably coupled with a front wheel or a front set of wheels in a configuration where said cargo hold chassis is operatively ahead of said battery support chassis.

In at least an embodiment, said battery support chassis is communicably coupled with a front wheel or a front set of wheels in a configuration where said battery support chassis is operatively ahead of said cargo hold chassis.

In at least an embodiment, said cargo hold chassis is communicably coupled with a front wheel or a front set of wheels, said front wheel being located on a front axle communicably coupled to a steering mechanism.

In at least an embodiment, said cargo hold chassis is defined such that an operative front half of said cargo hold chassis is made relatively heavier and an operative rear half of said cargo hold chassis is made relatively lighter for mass centralization.

In at least an embodiment, said cargo hold chassis comprises a front member (lateral front support member) configured to be provided with a steering member for said vehicle.

In at least an embodiment, said cargo hold chassis comprises a rear member (lateral back support member) configured to be provided with a rider and pillion support chassis.

In at least an embodiment, said battery support chassis comprises a structural framework with at least a lateral support member (i.e. front and back support member) along with an operative top support member and an operative bottom support member to form a contoured framework to hold a battery within said framework.

In at least an embodiment, said battery support chassis is communicably coupled with a rear wheel or a rear set of wheels, rear wheel is located on a rear axle.

In at least an embodiment, said cargo hold chassis is communicably coupled with a rear wheel or a rear set of wheels, rear wheel is located on a rear axle.

In at least an embodiment, said rider and pillion support chassis comprises a structural framework with at least an operative top support member and an operative bottom support member to form a contoured framework to hold a rider and a pillion on its top support member.

In at least an embodiment, a top support member of said rider and pillion support chassis is located at a height defined in a range of 0 mm to 800 mm, from a rear axle, such that a rider and a pillion, when seated, have their cumulative individual centre of gravity operatively higher than an individual centre of gravity of cargo load.

In at least an embodiment, said rider and pillion support chassis is substantially higher than base of said cargo hold chassis which aligns with/is in the same plane as said vehicle's rear wheel's centre.

In at least an embodiment, a lateral support member of said cargo hold chassis and the front lateral support member of said battery support chassis is a single same member.

In at least an embodiment, a back lateral support member of said battery support chassis and a front lateral support member of said rider and pillion support chassis is a single same member.

In at least an embodiment, a top support member of said cargo hold chassis is equal in length when correlated with a top support member of said battery support chassis in conjunction with a top support member of said rider and pillion support chassis.

In at least an embodiment, said cargo hold chassis comprises a swing arm pivot for mounting a swing arm and at least one mounting location for suspension mounts.

In at least an embodiment, said battery hold chassis comprises a swing arm pivot for mounting a swing arm and at least one mounting location for suspension mounts.

In at least an embodiment, a top member of said cargo hold chassis frame or a top member of said battery support chassis frame is an extension from a steering column, and is not connected to a rear part of said frame, thereby keeping said frame open and providing an open cargo hold chassis or an open battery support chassis.

In at least an embodiment, a top member of said cargo hold chassis frame or a top member of said battery support chassis frame is an extension from a rear lateral column of said cargo hold chassis or from a rear lateral column of said battery support chassis and is not connected to a front part of said frame, thereby keeping said frame open, and providing an open cargo hold chassis or an open battery support chassis.

In at least an embodiment, said cargo hold chassis comprises two steering columns in its operative front.

In at least an embodiment, said cargo hold chassis comprises two steering columns in its operative front, characterised in that, a first steering column defines a rake angle of a front suspension and a second steering column provided for translation of steering input to a triple tree.

In at least an embodiment, said cargo hold chassis comprises two steering columns in its operative front, characterised in that, the intersection of a first axis line along a first steering column and a second axis line along a second steering column defines a point where a constant velocity joint is fixed.

In at least an embodiment, weight distribution is such that distribution of weight at a front axle varies between 25% and 75% while distribution of weight at a corresponding rear axle varies between 75% and 25%.

In at least an embodiment, said cargo hold chassis being designed to maintain centre of gravity of said vehicle along with said vehicle in a pre-defined zone, in that, front axle weight bearing being greater than 25% and less than 75% while corresponding rear axle weight bearing being lesser than 75% and greater than 25%.

In at least an embodiment, weight of battery in said battery support chassis along with weight of cargo in the cargo hold chassis substantially counterbalances weight of rider on said rider and pillion support chassis in conjunction with weight of pillion on said rider and pillion support chassis; thereby, maintaining the centre of gravity of said vehicle, especially after addition of cargo, battery, rider, and pillion, relatively lower (closer to ground) and substantially on or very near to the centerline of the wheelbase of this vehicle.

In at least an embodiment, an operative front wheel of said vehicle is relatively smaller than an operative rear wheel of said vehicle, thereby making said chassis forward bias, thereby increasing weight on said front wheel when cargo and battery is loaded onto said cargo hold chassis and battery support chassis which is counterbalanced by the rider and pillion load, thereby helping in mass centralization.

In at least an embodiment, an operative rear wheel of said vehicle is relatively smaller than an operative front wheel of said vehicle, thereby making said chassis rearward bias, thereby increasing weight on said rear wheel, which is counterbalanced when a rider and pillion are seated on said rider and pillion support chassis and cargo is added onto said cargo hold chassis and battery is located in the battery support chassis.

In at least an embodiment, said vehicle comprising a gyroscope located at the base of said cargo hold chassis to improve handling of said vehicle.

In at least an embodiment, said vehicle's handlebar axis is longitudinally in line with a steering axis.

In at least an embodiment said vehicle's handlebar axis is parallel to a steering axis.

In at least an embodiment, said vehicle's handlebar axis is angularly displaced with respect to a steering axis.

In at least an embodiment, said vehicle's handlebar is located on top of said cargo hold chassis.

In at least an embodiment, said vehicle's handlebar is located on top of said battery hold chassis.

In at least an embodiment said battery hold chassis, and/or addition of rider(s) and/or pillion(s) on said rider and pillion support chassis decreases height of centre of gravity of said vehicle; thereby, improving handling and dynamics of said vehicle.

In at least an embodiment, a centre of gravity of said cargo hold chassis combined with a battery support chassis, when there is no cargo and no battery, is defined to be inside a cargo and battery triangle defined by co-ordinates at a first point, a second point, and a fifth point, said first point is defined as an intersection point of an imaginary line along the handlebar axis and a line parallel to the top member or a line tangential to handlebar mounting point, said second point is defined at the front axle, said fifth point is defined at the pillion footrest.

In at least an embodiment, a centre of gravity of said rider and pillion support chassis, when there is no rider and no pillion, is defined to be inside a rider and pillion triangle defined by co-ordinates at a first point, a sixth point, and a fourth point, said first point is defined as an intersection point of an imaginary line along the handlebar axis and a line parallel to the top member or a line tangential to handlebar mounting point, said sixth point is defined at the operatively rearward farthest point on the rider and pillion support chassis, and said fourth point is defined at the rider footrest.

In at least an embodiment, a centre of gravity of said cargo hold chassis, when there is cargo loaded, is defined to be inside a cargo triangle defined by co-ordinates at a first point, a second point, and a fourth point, said first point is defined as an intersection point of an imaginary line along the handlebar axis and a line parallel to the top member or a line tangential to handlebar mounting point, a second point is defined at the front axle, and a fourth point is defined at the defined at the rider footrest.

In at least an embodiment, a centre of gravity of the battery support chassis, when there is battery loaded, is defined to be inside a battery triangle defined by co-ordinates at a first point, a third point, and a fifth point, said first point is defined as an intersection point of an imaginary line along the handlebar axis and a line parallel to the top member or a line tangential to handlebar mounting point, said third point is defined at the bottom farthest point on the cargo hold chassis when the cargo hold chassis is operatively in front of the battery hold chassis, and said fifth point is defined at the pillion footrest.

In at least an embodiment, a centre of gravity of the rider and pillion support chassis, when there is no rider and no pillion, is defined to be inside a rider and pillion triangle defined by co-ordinates at a first point, a fourth point, and a sixth point, said first point is defined as an intersection point of an imaginary line along the handlebar axis and a line parallel to the top member or a line tangential to handlebar mounting point, said fourth point is defined at the rider footrest, and said sixth point is defined at the operatively rearward farthest point on the rider and pillion support chassis.

In at least an embodiment, a combined centre of gravity of the cargo hold chassis along with battery support chassis, when there is cargo loaded and battery loaded, with cargo in front of battery or with battery in front of cargo or battery below said cargo or battery above said cargo, is defined to be inside a cargo and battery triangle defined by co-ordinates at a first point, a second point, and a fifth point, said first point is defined as an intersection point of an imaginary line along the handlebar axis and a line parallel to the top member or a line tangential to handlebar mounting point, said second point is defined at the front axle, and a fifth point is defined at the pillion footrest.

In at least an embodiment, a centre of gravity of the battery is defined to be inside a battery triangle defined by co-ordinates at a first point, a second point, and an eighth point, said first point is defined as an intersection point of an imaginary line along the handlebar axis and a line parallel to the top member or a line tangential to handlebar mounting point, said second point is defined at the front axle, and an eighth point is defined at the farthest bottom point on the battery support chassis.

In at least an embodiment, a centre of gravity of the cargo is defined to be inside a cargo triangle defined by co-ordinates at a first point, an eighth point, and a fifth point, said first point is defined as an intersection point of an imaginary line along the handlebar axis and a line parallel to the top member or a line tangential to handlebar mounting point, said eighth point is defined at the farthest bottom point on the battery support chassis, and a fifth point is defined at the pillion footrest.

In at least an embodiment, a centre of gravity of a rider on the rider and pillion support chassis is defined to be inside a rider triangle defined by co-ordinates at a first point, a fourth point, and a seventh point, said first point is defined as an intersection point of an imaginary line along the handlebar axis and a line parallel to the top member or a line tangential to handlebar mounting point, said fourth point is defined at the rider footrest, and said seventh point is defined as a point on an imaginary line perpendicular to ground and passing through the rear axle, at a distance of not more 1300 mm upwards from the rear axle.

In at least an embodiment, a combined centre of gravity of the rider and cargo on the rider and pillion support is defined to be inside a rider and cargo quadrilateral defined by co-ordinates at said first point, said fourth point, said sixth point, and a seventh point, said first point is defined as an intersection point of an imaginary line along the handlebar axis and a line parallel to the top member or a line tangential to handlebar mounting point, said fourth point is defined at the rider footrest, said sixth point is defined at the operatively rearward farthest point on the rider and pillion support chassis, and said seventh point is defined as a point of an imaginary line perpendicular to ground and passing through the rear axle, at a distance of not more 1300 mm upwards from the rear axle.

In at least an embodiment, a combined centre of gravity of the entire vehicle defined to be inside a vehicle and rider polygon defined by co-ordinates at a first point, a second point, a fourth point, a sixth point, and a seventh point, said first point is defined as an intersection point of an imaginary line along the handlebar axis and a line parallel to the top member or a line tangential to handlebar mounting point, said second point is defined at the front axle, said fourth point is defined at the rider footrest, said sixth point is defined at the operatively rearward farthest point on the rider and pillion support chassis, and said seventh point is defined as a point of an imaginary line perpendicular to ground and passing through the rear axle, at a distance of not more 1300 mm upwards from the rear axle.

In at least an embodiment, a combined centre of gravity of the rider and pillion on the rider and pillion support is defined to be inside a rider and pillion quadrilateral defined by co-ordinates at a first point, a fourth point, a sixth point, and a seventh point, said first point is defined as an intersection point of an imaginary line along the handlebar axis and a line parallel to the top member or a line tangential to handlebar mounting point, said fourth point is defined at the rider footrest, said sixth point is defined at the operatively rearward farthest point on the rider and pillion support chassis, and said seventh point is defined as a point of an imaginary line perpendicular to ground and passing through the rear axle, at a distance of not more 1300 mm upwards from the rear axle.

In at least an embodiment, a combined centre of gravity of the entire vehicle is defined to be inside a vehicle, rider, and pillion rider polygon defined by co-ordinates at a first point, a second point, a fourth point, a sixth point, and a seventh point, said first point is defined as an intersection point of an imaginary line along the handlebar axis and a line parallel to the top member or a line tangential to handlebar mounting point, said second point is defined at the front axle, said fourth point is defined at the rider footrest, said sixth point is defined at the operatively rearward farthest point on the rider and pillion support chassis, and seventh point is defined as a point of an imaginary line perpendicular to ground and passing through the rear axle, at a distance of not more 1300 mm upwards from the rear axle.

In at least an embodiment, said vehicle's centre of gravity is defined by a trapezoid wherein trapezoid centre of gravity coordinates are defined where two points are on the front frame members of said cargo hold chassis and two points on the rearmost part of the rider and pillion support chassis.

In at least an embodiment, said vehicle comprising a handlebar of said vehicle is located longitudinally spaced apart from the steering axis.

In at least an embodiment, said vehicle comprising steering mechanism, said steering mechanism being a four-bar linkage mechanism or a rack and pinion mechanism or a bevel gear mechanism or a cable mechanism.

In at least an embodiment, said vehicle comprising steering mechanism, said steering mechanism being located operatively atop the cargo hold chassis or the battery support chassis.

In at least an embodiment, said vehicle comprising steering mechanism, said steering mechanism comprising a steering column mounted in an operative front of said cargo hold chassis or said battery support chassis, the axis of said steering mechanism is collinear with a front suspension axis, the steering column is spaced apart from said steering handle, and a vertical axis about which said steering handle is located is spaced apart from a vertical central axis of said cargo hold chassis in order to provide for off-centre steering.

In at least an embodiment, said vehicle comprising a steer-by-wire steering mechanism or a power steering mechanism.

In at least an embodiment, a main stand of said vehicle being positioned in an operative rear part of said cargo hold chassis and between an imaginary line passing through a centre of said wheelbase and a rear axle.

In at least an embodiment, a side stand of said vehicle being positioned in an operative rear part of said cargo hold chassis and between an imaginary line passing through a centre of said wheelbase and a rear axle.

In at least an embodiment, said vehicle's centre of gravity lies in a pre-defined zone which maintains innate balance of said vehicle irrespective of a rider riding or not, irrespective of cargo loaded or not, said pre-defined zone being defined by a boundary with its front extremities not exceeding internal framework of said cargo hold chassis, with its rear extremities not exceeding hip of a pillion riding said rider and pillion support chassis, with its upper extremities not exceeding an upper frame of said cargo hold chassis, and with its lower extremities not exceeding a lower frame of said cargo hold chassis.

According to this invention, there is also provided a cargo-carrying wheeled vehicle comprising:
  at least an integrated cargo and battery support chassis;
  at least a rider and pillion support chassis configured to be operatively behind said integrated cargo and battery support chassis, in that, said integrated cargo and battery support chassis and said rider and pillion support chassis cooperate to maintain centre of gravity of said vehicle, after addition of cargo, battery, rider, and pillion, relatively lower (closer to ground) and substantially on or very near to the centerline of the wheelbase of this vehicle;
    wherein, an operative spaced apart distance between a centre of gravity of cargo in said integrated cargo and battery support chassis and a centre of gravity of battery in said integrated cargo and battery support chassis is defined by a first locus of points which lie within a first value and a second value, said first value being equal to zero times the wheelbase of said vehicle and said second value being half the wheelbase of said vehicle;
    wherein, an operative spaced apart distance between a centre of gravity of battery in said integrated cargo and battery support chassis and a centre of gravity of rider and pillion on said rider and pillion support chassis is defined by a second locus of points which lie within a third value and a fourth value, said third value being equal to zero times the wheelbase of said vehicle and said fourth value being nine-tenths the wheelbase of said vehicle;

wherein, an operative spaced apart distance between a centre of gravity of cargo in said integrated cargo and battery support chassis and a centre of gravity of rider and pillion on said rider and pillion support chassis is defined by a third locus of points which lie within a fifth value and a sixth value, said fifth value being equal to zero times the wheelbase of said vehicle and said sixth value being nine-tenths the wheelbase of said vehicle;

wherein, a combined centre of gravity being formed by a centre of gravity of said cargo in said integrated cargo and battery support chassis, a centre of gravity of said battery in said integrated cargo and battery support chassis, a centre of gravity of said rider and pillion on said rider and pillion support chassis, characterised in that, said combined centre of gravity being defined by a fourth locus of points which lie within a seventh value and an eighth value, said seventh value being equal to half the wheelbase of said vehicle added to one-third the wheelbase of said vehicle and said eighth value being equal to one-third the wheelbase of said vehicle subtracted from half the wheelbase of said vehicle; and said combined centre of gravity being defined by a fifth locus of points which lie within a ninth value and a tenth value, said ninth value being equal to radius of a wheel of said vehicle and said tenth value being equal to a value defined by radius of a wheel of said vehicle added to one-third of the wheelbase of said vehicle.

According to this invention, there is also provided a cargo-carrying wheeled vehicle comprising:

at least a cargo hold chassis;

at least an integrated battery and rider—pillion support chassis configured to be operatively behind said cargo hold chassis, in that, said cargo hold chassis, and said an integrated battery and rider—pillion support chassis cooperate to maintain centre of gravity of said vehicle, after addition of cargo, battery, rider, and pillion, relatively lower (closer to ground) and substantially on or very near to the centerline of the wheelbase of this vehicle;

wherein, an operative spaced apart distance between a centre of gravity of cargo in said cargo hold chassis and a centre of gravity of battery in said integrated battery and rider—pillion support chassis is defined by a first locus of points which lie within a first value and a second value, said first value being equal to zero times the wheelbase of said vehicle and said second value being two thirds of the wheelbase of said vehicle;

wherein, an operative spaced apart distance between a centre of gravity of battery in said integrated battery and rider—pillion support chassis and a centre of gravity of rider and pillion on said integrated battery and rider—pillion support chassis is defined by a second locus of points which lie within a third value and a fourth value, said third value being equal to zero times the wheelbase of said vehicle and said fourth value being two thirds of the wheelbase of said vehicle;

wherein, an operative spaced apart distance between a centre of gravity of cargo in said cargo hold chassis and a centre of gravity of rider and pillion on said integrated battery and rider—pillion support chassis is defined by a third locus of points which lie within a fifth value and a sixth value, said fifth value being equal to zero times the wheelbase of said vehicle and said sixth value being nine-tenths the wheelbase of said vehicle;

wherein, a combined centre of gravity being formed by a centre of gravity of said cargo in said cargo hold chassis, a centre of gravity of said battery in said integrated battery and rider—pillion support chassis, a centre of gravity of said rider and pillion on said integrated battery and rider—pillion support chassis, characterised in that, said combined centre of gravity being defined by a fourth locus of points which lie within a seventh value and an eighth value, said seventh value being equal to half the wheelbase of said vehicle added to one-third the wheelbase of said vehicle and said eighth value being equal to one-third the wheelbase of said vehicle subtracted from half the wheelbase of said vehicle; and said combined centre of gravity being defined by a fifth locus of points which lie within a ninth value and a tenth value, said ninth value being equal to radius of a wheel of said vehicle and said tenth value being equal to a value defined by radius of a wheel of said vehicle added to one-third of the wheelbase of said vehicle.

According to this invention, there is also provided a cargo-carrying wheeled vehicle comprising:

at least a cargo hold, battery, and rider—pillion support chassis with cargo hold placed operatively ahead of said rider and pillion, in that, at least a battery being located at a location selected from any location in said cargo hold area, any location beneath said rider and pillion, and its combinations, wherein, a cumulative centre of gravity of said cargo and said battery being defined by an integrated cumulative cargo—battery quadrilateral defined by a first point, a second point, a fourth point, and a sixth point, in that, said first point being defined as an intersection point of an imaginary line along the handlebar axis and a line parallel to the top member or a line tangential to handlebar mounting point, said second point being defined at the front axle, said fourth point being defined at the rider footrest, and said sixth point being defined at the operatively rearward farthest point on the rider and pillion support chassis.

BRIEF DESCRIPTION OF THE ACCOMPANYING DRAWINGS

The invention will now be described in relation to the accompanying drawings, in which.

DETAILED DESCRIPTION OF THE ACCOMPANYING DRAWINGS

According to this invention, there is provided a cargo-carrying wheeled vehicle.

Figure 1:
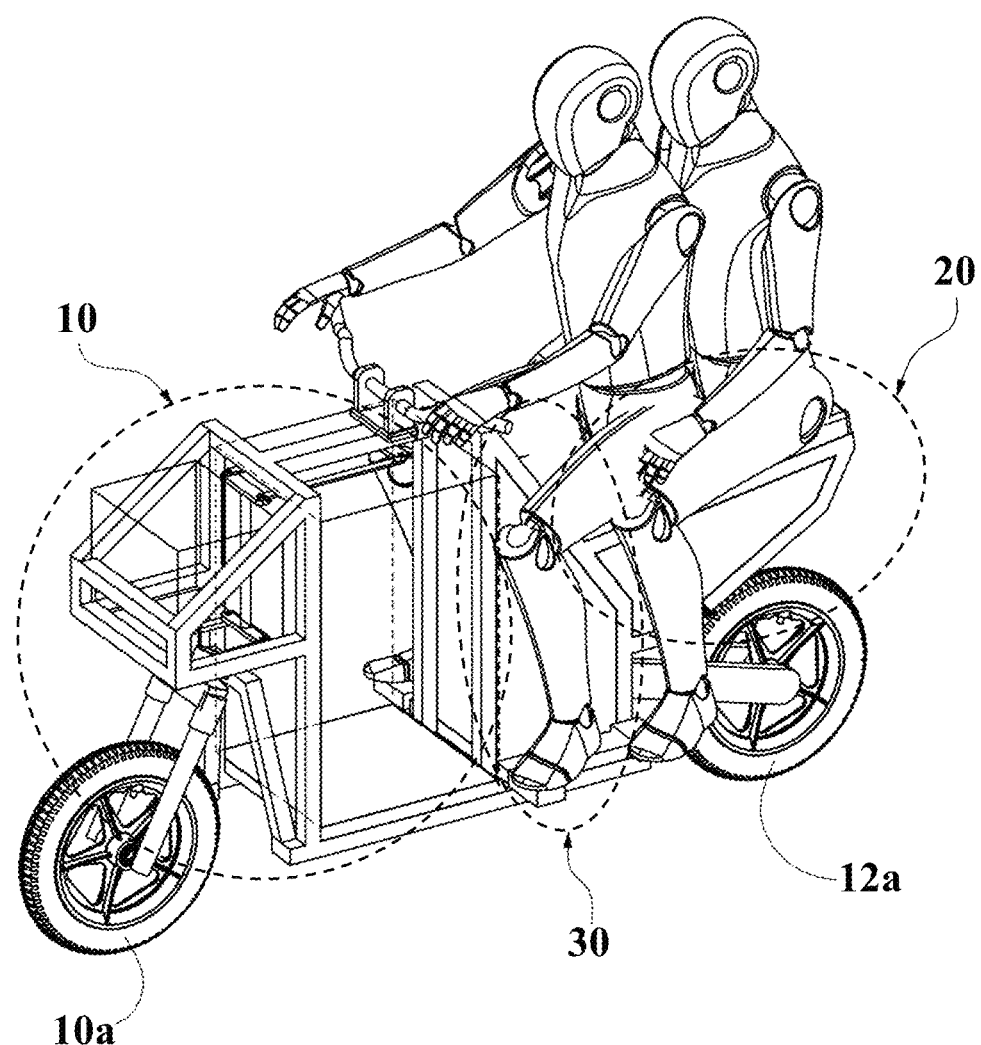
FIG. 1 illustrates an isometric view of the cargo-carrying vehicle along with rider and pillion.

FIG. 1 illustrates an isometric view of the cargo-carrying vehicle along with rider and pillion.

Figure 2:
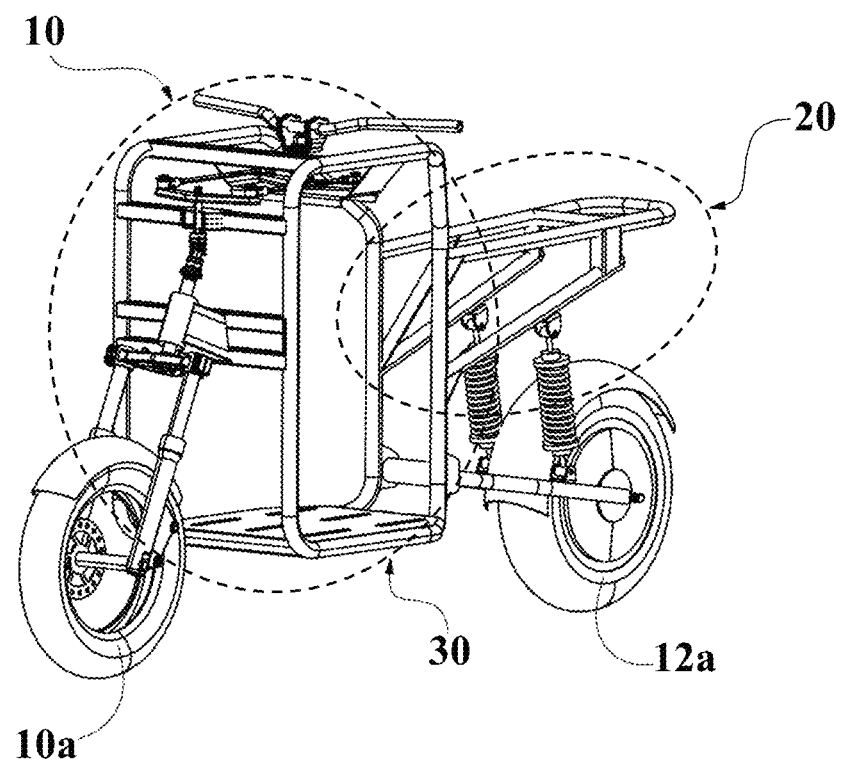
FIG. 2 illustrates another isometric view of the cargo-carrying vehicle in its bare structural framework format.

FIG. 2 illustrates another isometric view of the cargo-carrying vehicle in its bare structural framework format.

Figure 3:
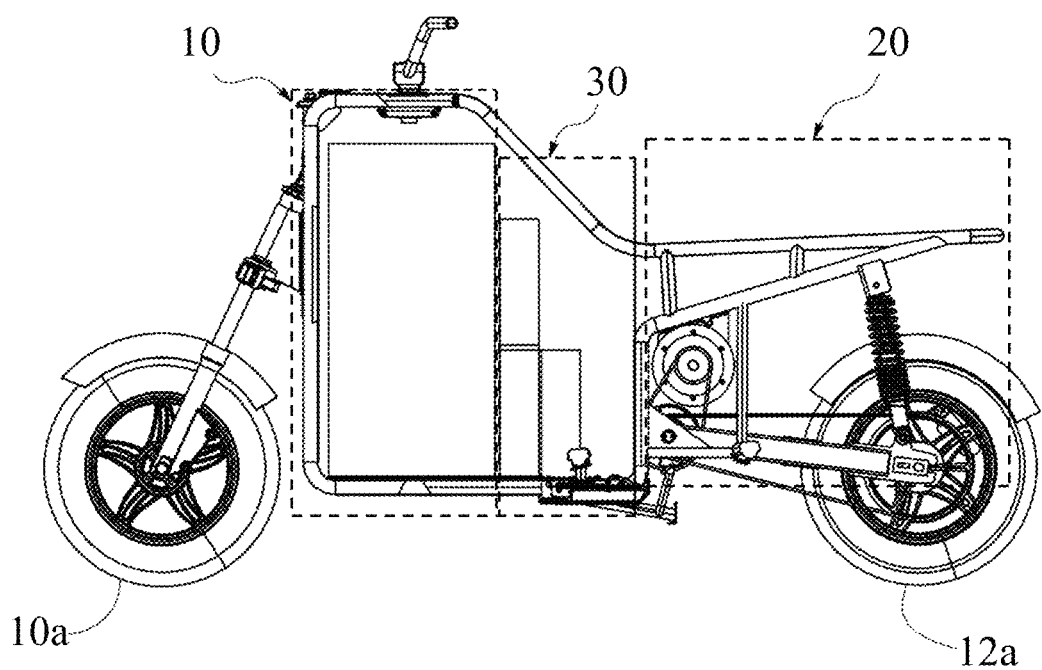
FIG. 3 illustrates a side view of the cargo-carrying vehicle.

FIG. 3 illustrates a side view of the cargo-carrying vehicle.

Figure 3A:
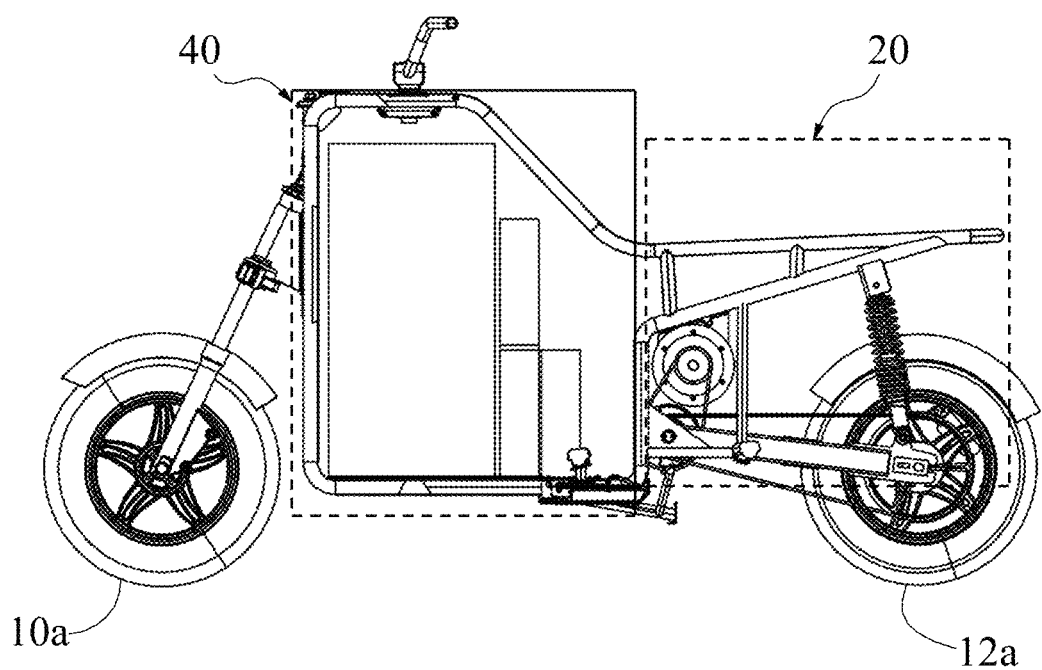
FIG. 3a illustrates a side view of another version of the cargo-carrying vehicle wherein a cargo hold chassis is integrated with a battery support chassis to form an integrated cargo and battery support chassis.

FIG. 3a illustrates a side view of another version of the cargo-carrying vehicle wherein a cargo hold chassis is integrated with a battery support chassis to form an integrated cargo and battery support chassis (40). The rider and pillion support chassis (20) is located operatively behind the integrated cargo and battery support chassis (40).

In this embodiment, of FIG. 3a, there is provided:
at least an integrated cargo and battery support chassis (40);
at least a rider and pillion support chassis (20) configured to be operatively behind said integrated cargo and battery support chassis (40), in that, said integrated cargo and battery support chassis (40) and said rider and pillion support chassis (20) cooperate to maintain centre of gravity of said vehicle, after addition of cargo, battery, rider, and pillion, relatively lower (closer to ground) and substantially on or very near to the centerline of the wheelbase of this vehicle (between 10a and 12a);
wherein, an operative spaced apart distance between a centre of gravity of cargo in said integrated cargo and battery support chassis (40) and a centre of gravity of battery in said integrated cargo and battery support chassis (40) is defined by a first locus of points which lie within a first value and a second value, said first value being equal to zero times the wheelbase of said vehicle and said second value being half the wheelbase of said vehicle;
wherein, an operative spaced apart distance between a centre of gravity of battery in said integrated cargo and battery support chassis (40) and a centre of gravity of rider and pillion on said rider and pillion support chassis (20) is defined by a second locus of points which lie within a third value and a fourth value, said third value being equal to zero times the wheelbase of said vehicle and said fourth value being nine-tenths the wheelbase of said vehicle;

wherein, an operative spaced apart distance between a centre of gravity of cargo in said integrated cargo and battery support chassis (40) and a centre of gravity of rider and pillion on said rider and pillion support chassis (20) is defined by a third locus of points which lie within a fifth value and a sixth value, said fifth value being equal to zero times the wheelbase of said vehicle and said sixth value being nine-tenths the wheelbase of said vehicle;

wherein, a combined centre of gravity being formed by a centre of gravity of said cargo in said integrated cargo and battery support chassis (40), a centre of gravity of said battery in said integrated cargo and battery support chassis (40), a centre of gravity of said rider and pillion on said rider and pillion support chassis (20), characterised in that, said combined centre of gravity being defined by a fourth locus of points which lie within a seventh value and an eighth value, said seventh value being equal to half the wheelbase of said vehicle added to one-third the wheelbase of said vehicle and said eighth value being equal to one-third the wheelbase of said vehicle subtracted from half the wheelbase of said vehicle; and said combined centre of gravity being defined by a fifth locus of points which lie within a ninth value and a tenth value, said ninth value being equal to radius of a wheel of said vehicle and said tenth value being equal to a value defined by radius of a wheel of said vehicle added to one-third of the wheelbase of said vehicle.

Figure 3B:
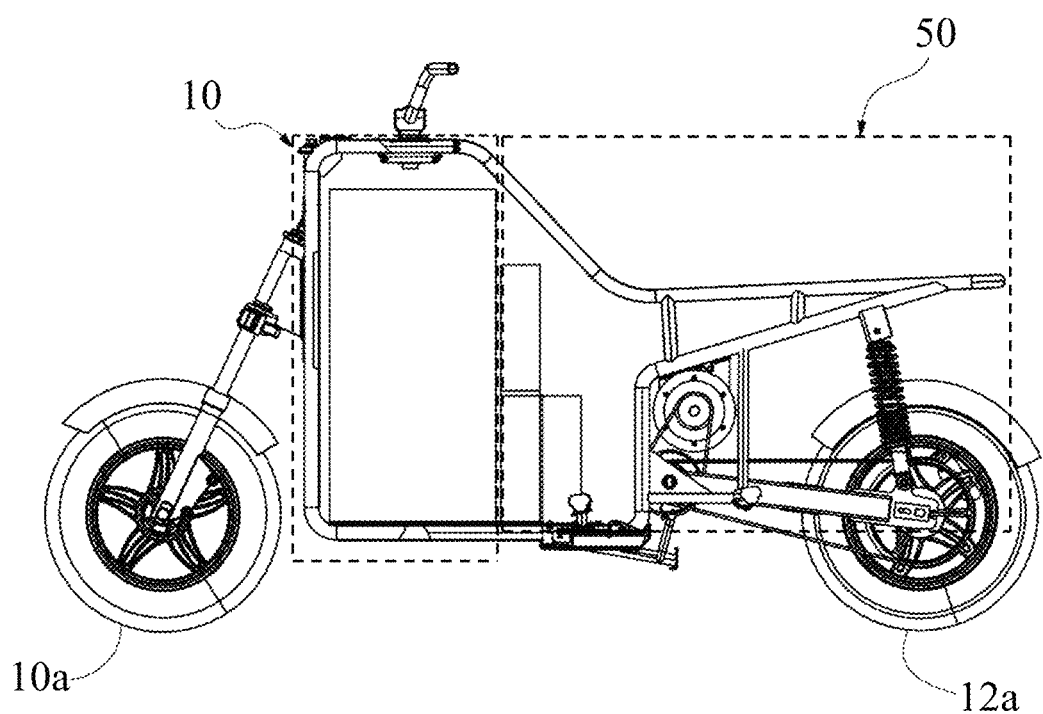
FIG. 3b illustrates a side view of yet another version of the cargo-carrying vehicle wherein a battery support chassis is integrated with a rider and pillion support chassis to form an integrated battery and rider—pillion support chassis.

FIG. 3b illustrates a side view of yet another version of the cargo-carrying vehicle wherein a battery support chassis is integrated with a rider and pillion support chassis to form an integrated battery and rider—pillion support chassis (50). The cargo hold chassis (10) is located operatively ahead of the integrated battery and rider—pillion support chassis (50).

In this embodiment, of FIG. 3b, there is provided:

at least a cargo hold chassis (10);

at least an integrated battery and rider—pillion support chassis (50) configured to be operatively behind said cargo hold chassis (10), in that, said cargo hold chassis (10), and said an integrated battery and rider—pillion support chassis (50) cooperate to maintain centre of gravity of said vehicle, after addition of cargo, battery, rider, and pillion, relatively lower (closer to ground) and substantially on or very near to the centerline of the wheelbase of this vehicle (between 10a and 12a);

wherein, an operative spaced apart distance between a centre of gravity of cargo in said cargo hold chassis (10) and a centre of gravity of battery in said integrated battery and rider—pillion support chassis (50) is defined by a first locus of points which lie within a first value and a second value, said first value being equal to zero times the wheelbase of said vehicle and said second value being two thirds of the wheelbase of said vehicle;

wherein, an operative spaced apart distance between a centre of gravity of battery in said integrated battery and rider—pillion support chassis (50) and a centre of gravity of rider and pillion on said integrated battery and rider—pillion support chassis (50) is defined by a second locus of points which lie within a third value and a fourth value, said third value being equal to zero times the wheelbase of said vehicle and said fourth value being two thirds of the wheelbase of said vehicle;

wherein, an operative spaced apart distance between a centre of gravity of cargo in said cargo hold chassis (10) and a centre of gravity of rider and pillion on said integrated battery and rider—pillion support chassis (50) is defined by a third locus of points which lie within a fifth value and a sixth value, said fifth value being equal to zero times the wheelbase of said vehicle and said sixth value being nine-tenths the wheelbase of said vehicle;

wherein, a combined centre of gravity being formed by a centre of gravity of said cargo in said cargo hold chassis (10), a centre of gravity of said battery in said integrated battery and rider—pillion support chassis (50), a centre of gravity of said rider and pillion on said integrated battery and rider—pillion support chassis (50), characterised in that, said combined centre of gravity being defined by a fourth locus of points which lie within a seventh value and an eighth value, said seventh value being equal to half the wheelbase of said vehicle added to one-third the wheelbase of said vehicle and said eighth value being equal to one-third the wheelbase of said vehicle subtracted from half the wheelbase of said vehicle; and said combined centre of gravity being defined by a fifth locus of points which lie within a ninth value and a tenth value, said ninth value being equal to radius of a wheel of said vehicle and said tenth value being equal to a value defined by radius of a wheel of said vehicle added to one-third of the wheelbase of said vehicle.

Figure 3C:
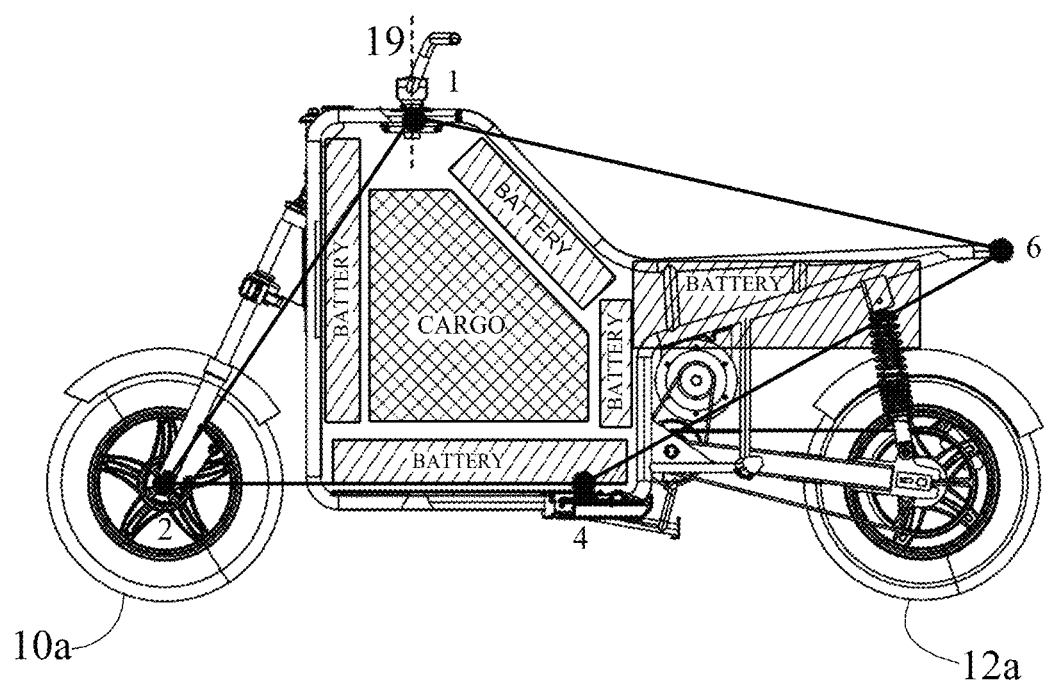
FIG. 3c illustrates a side view of still another version of the cargo-carrying vehicle wherein a cumulative integrated chassis comprises batteries distributed across the vehicle chassis.

FIG. 3c illustrates a side view of still another version of the cargo-carrying vehicle wherein a cumulative integrated chassis comprises batteries distributed across the vehicle chassis.

In this embodiment of FIG. 3c, the location of batteries may be selected from any location in the cargo hold chassis (up, down, side, rear, or the like) and/or at a location below a rider and pillion support chassis. It is observed that the cumulative centre of gravity of such a configuration lies within a quadrilateral defined by point 1, point 2, point 4, and point 6. Even in such a distributed configuration, with this centre of gravity configuration, it lends the vehicle a balanced ride. Point 1 is defined as an intersection point of an imaginary line along the handlebar axis and a line parallel to the top member or a line tangential to handlebar mounting point. Point 2 is defined at the front axle. Point 4 is defined at the rider footrest. Point 6 is defined at the operatively rearward farthest point on the rider and pillion support chassis.

Figure 4:
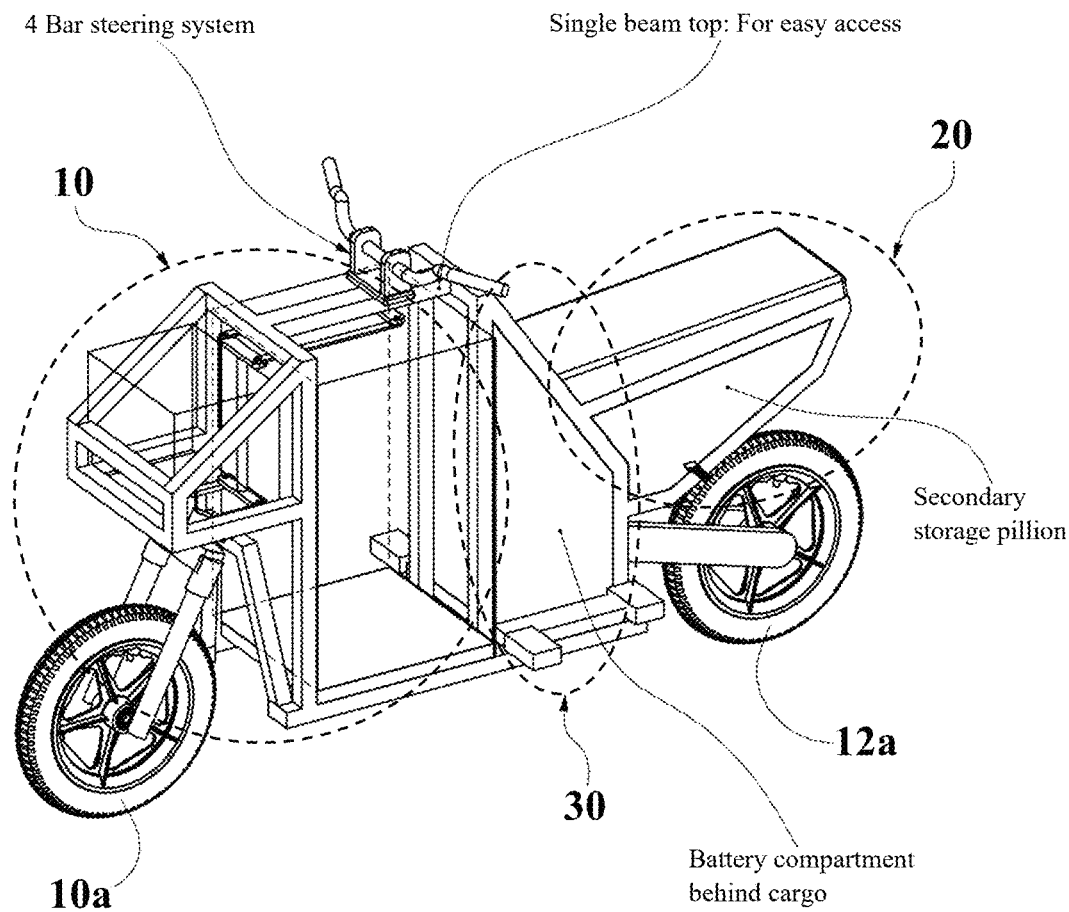
FIG. 4 illustrates another side view of the cargo-carrying vehicle.

FIG. 4 illustrates another side view of the cargo-carrying vehicle.

Figure 5:
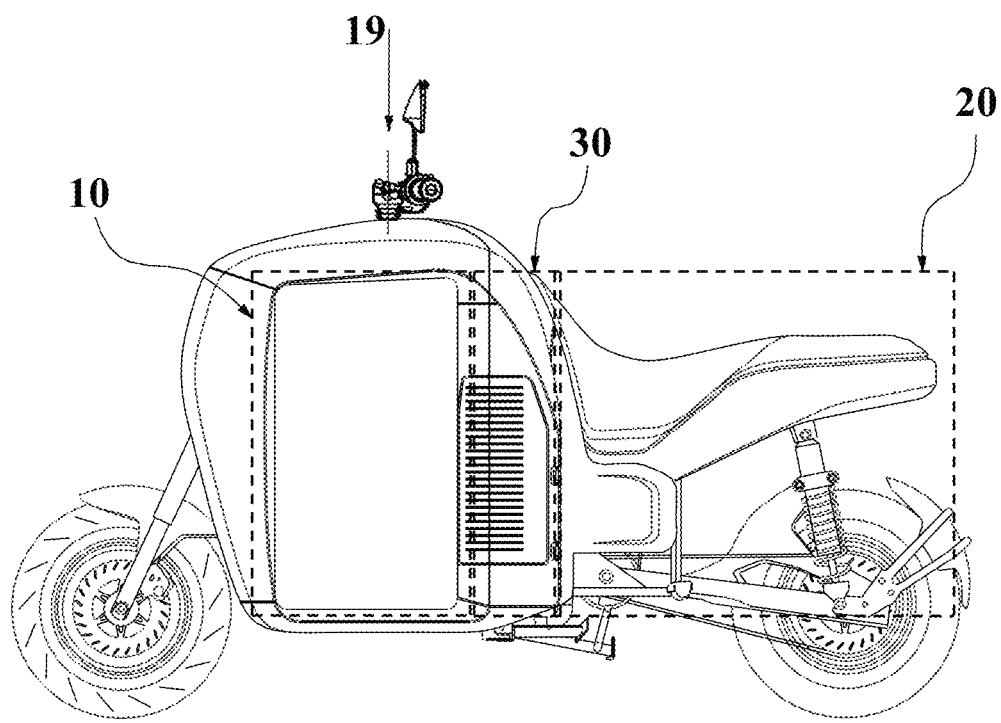
FIG. 5 illustrates a side view of another embodiment/rendition of the same cargo-carrying vehicle.

FIG. 5 illustrates a side view of another embodiment/rendition of the same cargo-carrying vehicle.

The vehicle is designed to provide a solution for the last mile delivery which is presently carried out using existing scooters or motorcycles which are not functionally and ergonomically designed for the last mile delivery. The scooter is specifically designed to carry cargo so that users can conveniently transport items such as groceries, children, food deliveries, warehouse items, etc. At the same time, through its simple cargo-focused design, the vehicle offers more utility for local transportation needs, at far less cost, with less maintenance than existing bicycles, tricycles, and kick scooters.

In at least an embodiment, this vehicle is defined in terms of at least a cargo hold chassis (10), at least a battery support chassis (30), and at least a rider and pillion support chassis (20). The limitations of the prior art are addressed by the geometries of the cargo hold chassis, the battery support chassis, and the rider and pillion support chassis. It is a desired objective of this invention to provide a structural framework in which the cargo hold chassis (10), the battery support chassis (30), and the rider and pillion support chassis (20) cooperate to maintain centre of gravity of the vehicle, especially after addition of cargo and rider and pillion, relatively lower (closer to ground) and substantially on or very near to the centerline of the wheelbase of this vehicle (between 10*a* and 12*a*).

In at least an embodiment, the cargo hold chassis comprises a structural framework which, essentially, holds a cargo within the structural framework. This cargo hold chassis is located operatively forward and operatively lower with respect to the rider and pillion support chassis. The cargo hold chassis comprises at least a lateral support member (i.e. front and back support member) along with an operative top support member and an operative bottom support member to form a contoured space to hold cargo. In one of the embodiments, any single or any combination of these support members can hold battery packs which are communicably coupled to the drive of this vehicle. The construction could also be made of on single tube bent to assume the shape. The side view of the frame provides a distinct cargo hold space which could be a polygon or a free form shape or the like. The cargo hold chassis, typically, is communicably coupled with a front wheel (10*a*) or a front set of wheels. The front wheel is located on a front axle communicably coupled to a steering mechanism.

In one embodiment, said cargo hold chassis (10) is communicably coupled with a front wheel (10*a*) or a front set of wheels in a configuration where said cargo hold chassis (10) is operatively ahead of said battery support chassis (30).

In another embodiment, said battery support chassis (30) is communicably coupled with a front wheel (10*a*) or a front set of wheels in a configuration where said battery support chassis (30) is operatively ahead of said cargo hold chassis (10).

In one other embodiment, the cargo hold chassis is defined such that an operative front half of this cargo hold chassis is made relatively heavier and an operative rear half of this cargo hold chassis is made relatively lighter for mass centralization. In this case, when a rider and pillion is seated on the rider and pillion support chassis, the entire vehicle is in a balanced configuration.

In at least an embodiment, a front member (lateral front support member) is configured to be provided with a steering member for this vehicle.

In at least an embodiment, a rear member (lateral back support member) is configured to be provided with a seat chassis or a seat frame.

Additionally, in at least one embodiment of this invention, the cargo hold chassis is designed to balance rider and pillion weight, cumulatively put together, with cargo load placed in the cargo chassis, thereby providing a mass centralization for ease of maneuver and for greater stability of this two-wheeled vehicle.

In at least an embodiment, the battery support chassis comprises a structural framework which, essentially, holds a battery pack. In one embodiment, the battery support chassis is located operatively rearward with respect to the cargo hold chassis. In another embodiment, the battery support chassis is located operatively forward with respect to the cargo hold chassis. In another embodiment, the battery support chassis is below or above the cargo hold chassis. The battery support chassis comprises at least a lateral support member (i.e. front and back support member) along with an operative top support member and an operative bottom support member to form a contoured framework to hold a battery within this defined framework. Battery support chassis, typically, is communicably coupled with a rear wheel (13*a*) or a rear set of wheels. The rear wheel is located on a rear axle. In another embodiment, the battery support chassis is located operatively forward with respect to or in the cargo hold chassis.

In one embodiment, said cargo hold chassis (10) is communicably coupled with a rear wheel (13*a*) or a rear set of wheels, rear wheel is located on a rear axle.

In at least an embodiment, the rider and pillion support chassis comprises a structural framework which, essentially, holds a rider along with a pillion on the structural framework. This rider and pillion support chassis is located operatively rearward with respect to the cargo hold chassis. The rider and pillion support chassis comprises at least an operative top support member and an operative bottom support member to form a contoured framework to hold a rider and a pillion on its top support member. In one of the embodiments, any single or any combination of these support members can hold battery packs which are communicably coupled to the drive of this vehicle. The top support member of the rider and pillion support chassis is located at a height such that the rider and pillion, when seated, have their cumulative individual centre of gravity operatively higher than the individual centre of gravity of the cargo load.

In one embodiment, a top support member of said rider and pillion support chassis (20) is located at a height defined in a range of 0 mm to 800 mm, from a rear axle, such that a rider and a pillion, when seated, have their cumulative individual centre of gravity operatively higher than an individual centre of gravity of cargo load.

In at least an embodiment, an operative spaced apart distance between a centre of gravity of cargo in said cargo hold chassis (10) and a centre of gravity of battery in said battery support chassis (30) is defined by a first locus of points which lie within a first value and a second value, said first value being equal to zero times the wheelbase of said vehicle and said second value being half the wheelbase of said vehicle.

In at least an embodiment, an operative spaced apart distance between a centre of gravity of battery in said battery support chassis (30) and a centre of gravity of rider and pillion on said rider and pillion support chassis (20) is defined by a second locus of points which lie within a third value and a fourth value, said third value being equal to zero times the wheelbase of said vehicle and said fourth value being nine-tenths the wheelbase of said vehicle.

In at least an embodiment, an operative spaced apart distance between a centre of gravity of cargo in said cargo hold chassis (10) and a centre of gravity of rider and pillion on said rider and pillion support chassis (20) is defined by a third locus of points which lie within a fifth value and a sixth value, said fifth value being equal to zero times the wheelbase of said vehicle and said sixth value being nine-tenths the wheelbase of said vehicle.

In at least an embodiment, a combined centre of gravity is formed by a centre of gravity of said cargo in said cargo hold chassis (10), a centre of gravity of said battery in said battery support chassis (30), a centre of gravity of said rider and pillion on said rider and pillion support chassis (20), characterised in that, said combined centre of gravity is defined by a fourth locus of points which lie within a seventh value and an eighth value, said seventh value being equal to half the wheelbase of said vehicle added to one-third the wheelbase of said vehicle and said eighth value being equal to one-third the wheelbase of said vehicle subtracted from half the wheelbase of said vehicle In at least an embodiment, a combined centre of gravity is formed by a centre of gravity of said cargo in said cargo hold chassis (10), a centre of gravity of said battery in said battery support chassis (30), a centre of gravity of said rider and pillion on said rider and pillion support chassis (20), characterised in that, said combined centre of gravity is defined by a fifth locus of points which lie within a ninth value and a tenth value, said ninth value being equal to radius of a wheel of said vehicle and said tenth value being equal to a value defined by radius of a wheel of said vehicle added to one-third the wheelbase of said vehicle.

In one embodiment, the rider and pillion support seat is substantially higher than the base of the cargo hold chassis which aligns/is in the same plane as the rear wheel's centre.

In one embodiment, the back lateral support member of the cargo hold chassis and the front lateral support member of the battery support chassis is a single same member.

In one embodiment, the back lateral support member of the battery support chassis and the front lateral support member of the rider and pillion support chassis is a single same member.

In one embodiment, the top support member of the cargo hold chassis is equal in length when correlated with the top support member of the battery support chassis in conjunction with the top support member of the rider and pillion support chassis.

Further, the cargo hold chassis comprises at least one swing arm pivot for mounting a swing arm and at least one mounting location for the suspension mounts.

In one embodiment, the battery hold chassis (30) comprises a swing arm pivot for mounting a swing arm and at least one mounting location for suspension mounts.

In at least an embodiment, a footrest for a rider to rest their feet being positioned extending from said vehicle at a distance from a centre of said wheelbase, said distance being defined by a value with a tolerance range of one-third said wheelbase added to or subtracted from said wheelbase.

Figure 6:
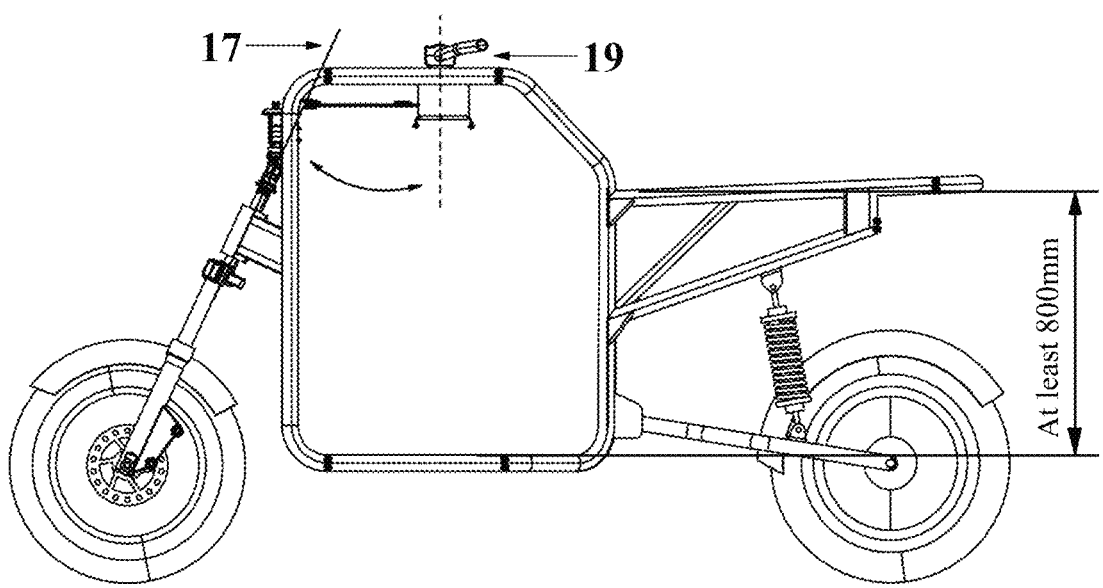
FIG. 6 illustrates first embodiment of the steering axis and a handlebar axis.

FIG. 6 illustrates first embodiment of the steering axis and a handlebar axis. In this first embodiment, the top member of the cargo hold chassis (10) frame or a top member of said battery support chassis (30) frame is an extension from the steering column, and is connected to the rear part of frame. When the frame is closed, the function remains same, it is an enclosed cargo hold chassis.

Reference numeral 17 refers to steering axis.
Reference numeral 19 refers to handlebar axis.

Figure 7:
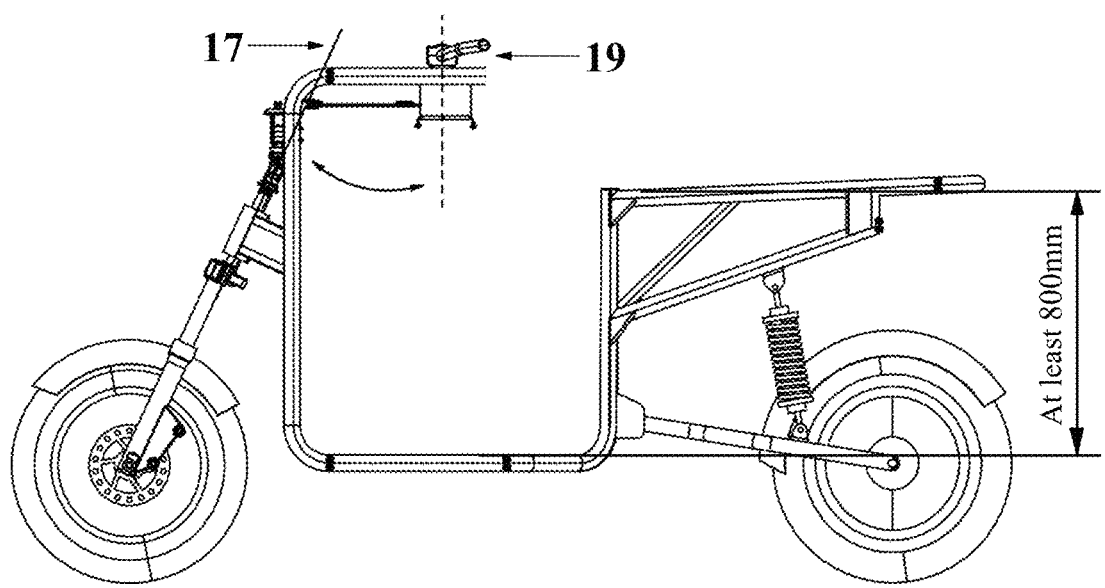
FIG. 7 illustrates a second embodiment of the steering axis and a handlebar axis.

FIG. 7 illustrates a second embodiment of the steering axis and a handlebar axis.

In this second embodiment, the top member of the frame is an extension from the steering column, and is not connected to the rear part of frame. When the frame is open, the function remains same, but it will not be an enclosed cargo hold chassis; rather it will be open cargo hold chassis.

Figure 8:
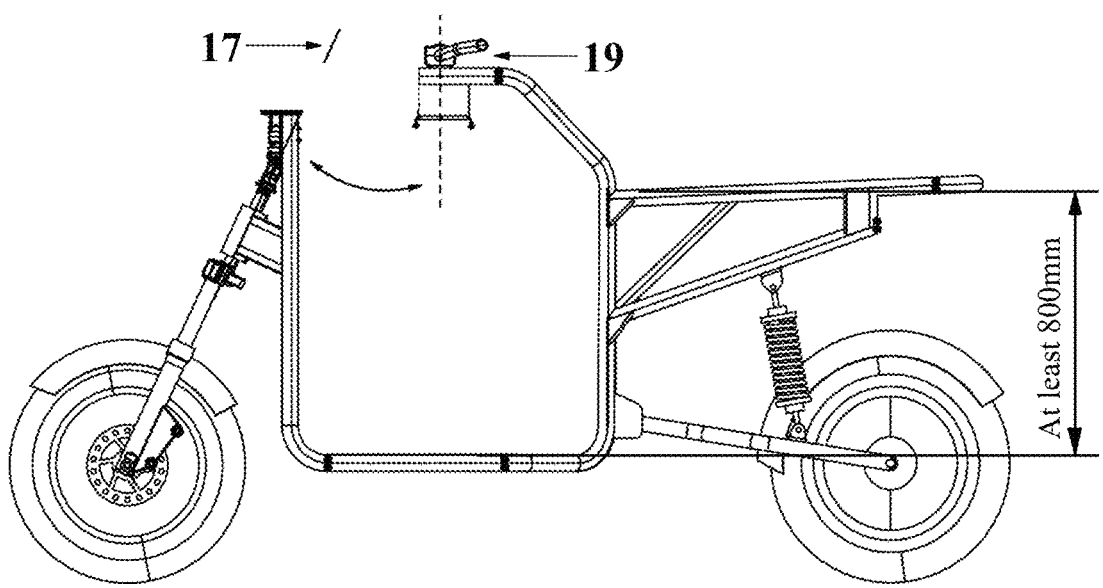
FIG. 8 illustrates a third embodiment of the steering axis and a handlebar axis.

FIG. 8 illustrates a third embodiment of the steering axis and a handlebar axis.

In this third embodiment, the top member of the frame is an extension from the rear lateral column of the cargo hold chassis (or from a rear lateral column of said battery support chassis) or from the rider pillion chassis and is not connected to the front part of frame. When the frame is open, the function remains same, but it will not be an enclosed cargo hold chassis; rather it will be open cargo hold chassis.

The top member extension is provided for the off-centre steering mechanism.

In at least an embodiment, the enclosed cargo hold chassis is described, where the cargo hold chassis comprises two steering columns in its operative front. The first steering column defines a rake angle of the front suspension and the second steering column is for translation of steering input to a triple tree. The intersection of a first axis line along the first steering column and a second axis line along the second steering column defines a point where a universal joint/constant velocity joint would be fixed.

In at least an embodiment, the front axle weight and the rear axle weight distribution are maintained in the following manner Front Axle Weight->=25% & Rear Axle Weight<=75%; or In terms of weight, the weight of battery (in the battery support chassis) along with weight of cargo (in the cargo hold chassis) substantially counterbalances the weight of the rider (on the rider and pillion support chassis) in conjunction with weight of the pillion (on the rider and pillion support chassis); thereby, maintaining the centre of gravity of the vehicle, especially after addition of cargo, battery, rider, and pillion, relatively lower (closer to ground) and substantially on or very near to the centerline of the wheelbase of this vehicle (between 10a and 12a).

In at least an embodiment, mass of centralization for this vehicle is achieved by adding cargo in the cargo hold chassis. When the vehicle is fully loaded and a rider and pillion are riding the vehicle, the centre of gravity is lying in proximity to centre of the wheelbase of the vehicle. Addition of load in the cargo hold area (defined by the cargo hold chassis), addition of battery in the battery hold chassis, and/or addition of rider(s) and/or pillion(s) on the rider and pillion support chassis—decreases height of the centre of gravity; thereby, improving handling and dynamics of this vehicle. Furthermore, when the vehicle is loaded with cargo and rider along with pillion are seated, the cargo load balances the rider weight and overall vehicle centre of gravity can be maintained at a desired location, which is close to centre of wheelbase of the vehicle, thereby helping in mass centralization.

In terms of mass of centralization, weight of battery (in the battery support chassis) and cargo (in the cargo hold chassis) substantially counterbalances the weight of the rider and pillion (on the rider and pillion support chassis); thereby, maintaining the centre of gravity of the vehicle, especially after addition of cargo, batter, rider, and pillion, relatively lower (closer to ground) and substantially on or very near to the centerline of the wheelbase of this vehicle (between 10a and 12a).

In another embodiment the mass centralization of the vehicle with cargo and rider is achieved by using different diameters of front and rear wheel. Use of smaller diameter wheel in front and bigger diameter wheel in front makes the chassis forward biased, thereby increasing the weight on front wheel, which is counterbalanced when rider and pillion is seated on the rider and pillion support chassis. When bigger diameter wheel is used in the front and smaller diameter wheel is used in the rear, the chassis becomes rear biased. The cargo weight in cargo hold chassis is balanced by the rider and pillion weight on the rider and pillion support chassis.

In at least an embodiment, the vehicle comprises a gyroscope located at the base of either the cargo hold chassis or the rider and pillion support chassis. Its aim is to improve handling of the vehicle.

In one embodiment, the handlebar axis is longitudinally in line with the steering axis. The handlebar axis can be parallel to a second steering axis or can be at an angle similar to the steering axis. Preferably, the handlebar is located on top of the cargo hold area or battery support chassis.

Figure 9:
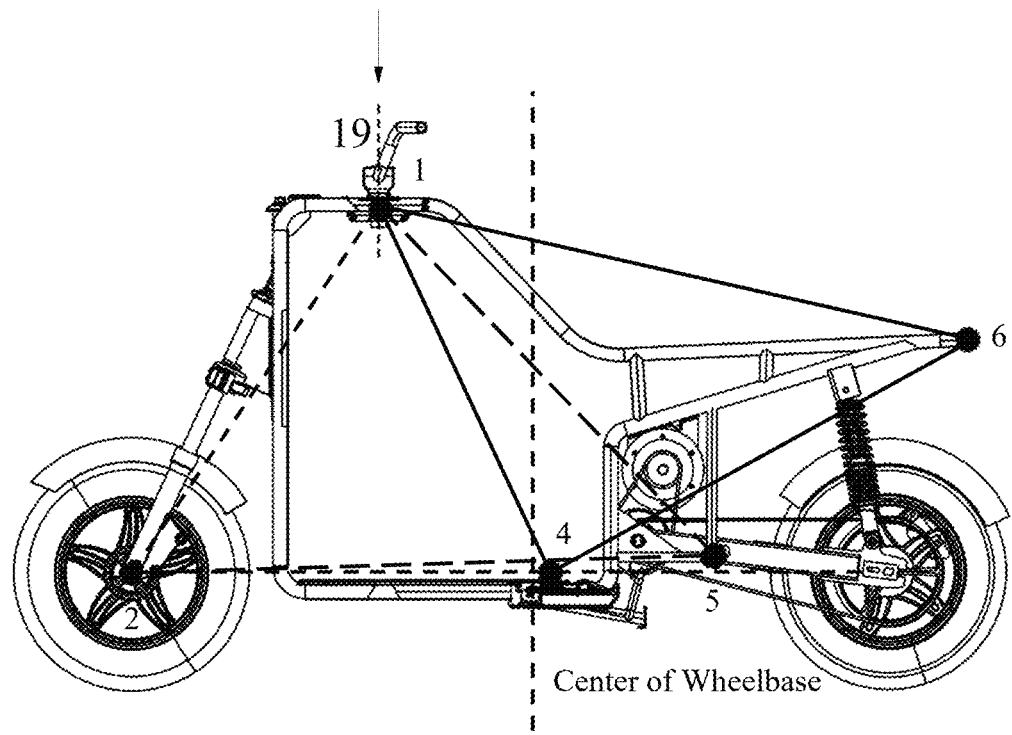
FIG. 9 illustrates two triangles for centres of gravity of the vehicle, where cargo hold chassis in ahead of battery support chassis, when there is no cargo, no battery, no rider, and no pillion.

FIG. 9 illustrates two triangles for centres of gravity of the vehicle, where cargo hold chassis in ahead of battery support chassis, when there is no cargo, no battery, no rider, and no pillion.

In at least an embodiment, the centre of gravity of the cargo hold chassis combined with the battery support chassis, when there is no cargo and no batter, is defined to be inside a cargo and battery triangle defined by co-ordinates at point 1, point 2, and point 5 of FIG. 9. Point 1 is defined as an intersection point of an imaginary line along the handlebar axis and a line parallel to the top member or a line tangential to handlebar mounting point. Point 2 is defined at the front axle. Point 5 is defined at the pillion footrest. In at least an embodiment, the centre of gravity of the rider and pillion support chassis, when there is no rider and no pillion, is defined to be inside a rider and pillion triangle defined by co-ordinates at point 1, point 6, and point 4 of FIG. 9. Point 1 is defined as an intersection point of an imaginary line along the handlebar axis and a line parallel to the top member or a line tangential to handlebar mounting point. Point 6 is defined at the operatively rearward farthest point on the rider and pillion support chassis. Point 4 is defined at the rider footrest.

Figure 10:
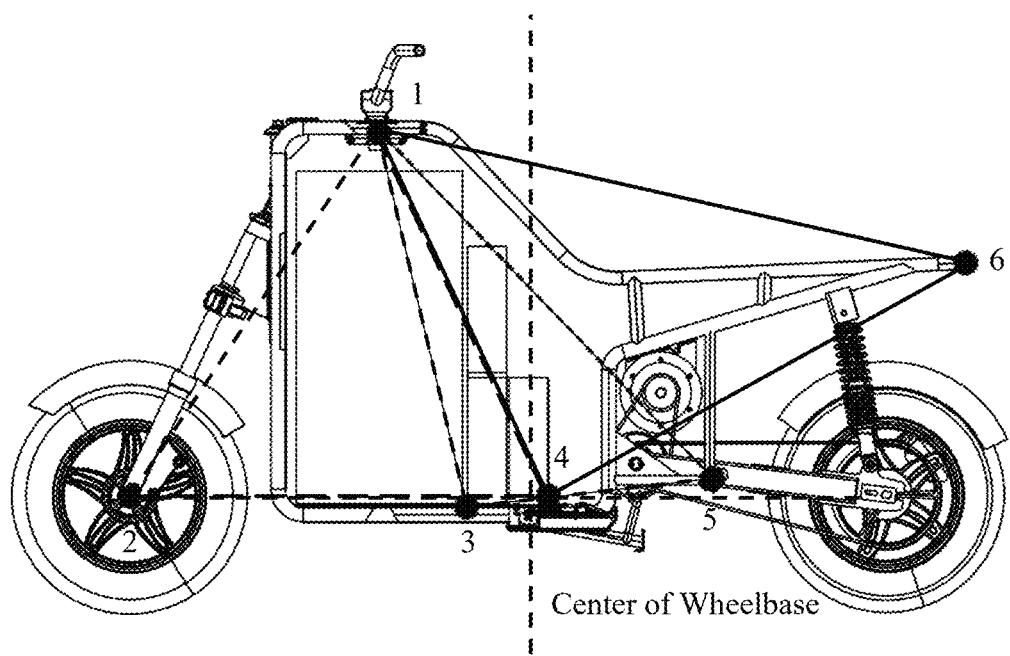
FIG. 10 illustrates three triangles for centres of gravity of the vehicle, where cargo hold chassis is ahead of battery support chassis, when there is cargo, battery, no rider, and no pillion.

FIG. 10 illustrates three triangles for centres of gravity of the vehicle, where cargo hold chassis is ahead of battery support chassis, when there is cargo, battery, no rider, and no pillion.

In at least an embodiment, the centre of gravity of the cargo hold chassis, when there is cargo loaded, is defined to be inside a cargo triangle defined by co-ordinates at point 1, point 2, and point 4 of FIG. 10. Point 1 is defined as an intersection point of an imaginary line along the handlebar axis and a line parallel to the top member or a line tangential to handlebar mounting point. Point 2 is defined at the front axle. Point 4 is defined at the rider footrest. In at least an embodiment, the centre of gravity of the battery support chassis, when there is battery loaded, is defined to be inside a battery triangle defined by co-ordinates at point 1, point 3, and point 5 of FIG. 10. Point 1 is defined as an intersection point of an imaginary line along the handlebar axis and a line parallel to the top member or a line tangential to handlebar mounting point. Point 3 is defined at the bottom operatively rearward farthest point on the cargo hold chassis when the cargo hold chassis is operatively in front of the battery hold chassis when the cargo hold chassis is operatively in front of the battery hold chassis. Point 5 is defined at the pillion footrest.

In at least an embodiment, the centre of gravity of the rider and pillion support chassis, when there is no rider and no pillion, is defined to be inside a rider and pillion triangle defined by co-ordinates at point 1, point 4, and point 6 of FIG. 10. Point 1 is defined as an intersection point of an imaginary line along the handlebar axis and a line parallel to the top member or a line tangential to handlebar mounting point. Point 4 is defined at the rider footrest. Point 6 is defined at the operatively rearward farthest point on the rider and pillion support chassis.

Dead cargo weight, in the cargo hold chassis, along with battery weight, in the battery support chassis, aids in improved handling by reducing height of centre of gravity of the combination of cargo triangle, battery triangle, and rider triangle.

Figure 11:
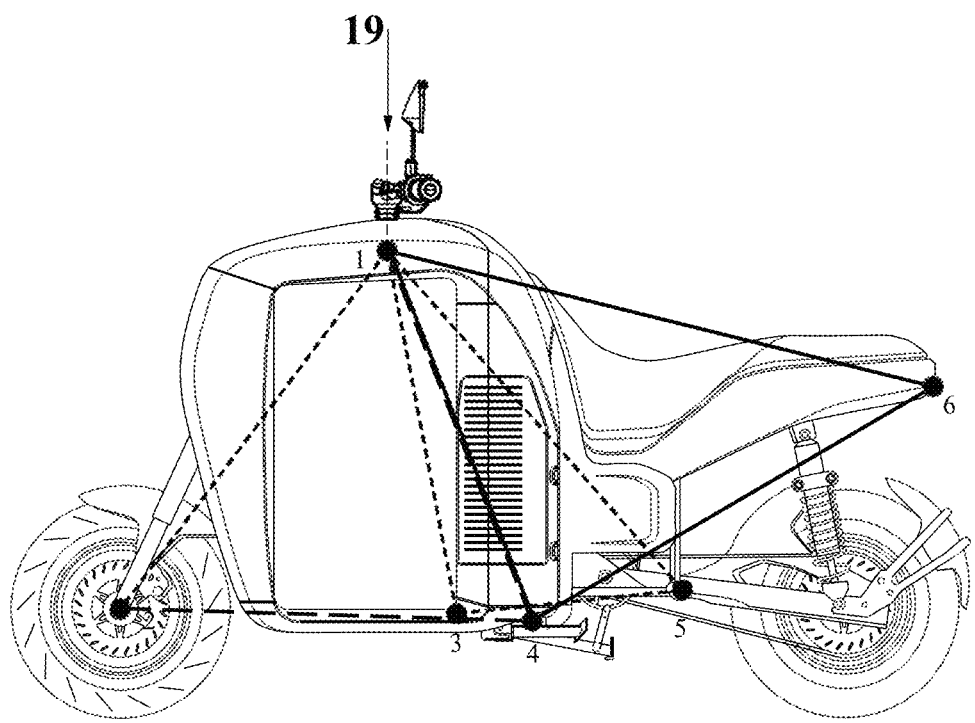
FIG. 11 illustrates three triangles for centres of gravity of another rendition of the same vehicle of FIG. 10 when there is cargo, battery, no rider, and no pillion.

FIG. 11 illustrates three triangles for centres of gravity of another rendition of the same vehicle of FIG. 10 when there is cargo, battery, no rider, and no pillion.

In at least an embodiment, the centre of gravity of the cargo hold chassis, when there is cargo loaded, is defined to be inside a cargo triangle defined by co-ordinates at point 1, point 2, and point 4 of FIG. 11. Point 1 is defined as an intersection point of an imaginary line along the handlebar axis and a line parallel to the top member or a line tangential to handlebar mounting point. Point 2 is defined at the front axle. Point 4 is defined at the rider footrest. In at least an embodiment, the centre of gravity of the battery support chassis, when there is battery loaded, is defined to be inside a battery triangle defined by co-ordinates at point 1, point 3, and point 5 of FIG. 10. Point 1 is defined as an intersection point of an imaginary line along the handlebar axis and a line parallel to the top member or a line tangential to handlebar mounting point. Point 3 is defined at the bottom operatively rearward farthest point on the cargo hold chassis when the cargo hold chassis is operatively in front of the battery hold chassis. Point 5 is defined at the pillion footrest.

In at least an embodiment, the centre of gravity of the rider and pillion support chassis, when there is no rider and no pillion, is defined to be inside a rider and pillion triangle defined by co-ordinates at point 1, point 4, and point 6 of FIG. 10. Point 1 is defined as an intersection point of an imaginary line along the handlebar axis and a line parallel to the top member or a line tangential to handlebar mounting point. Point 4 is defined at the rider footrest. Point 6 is defined at the operatively rearward farthest point on the rider and pillion support chassis.

Figure 12:
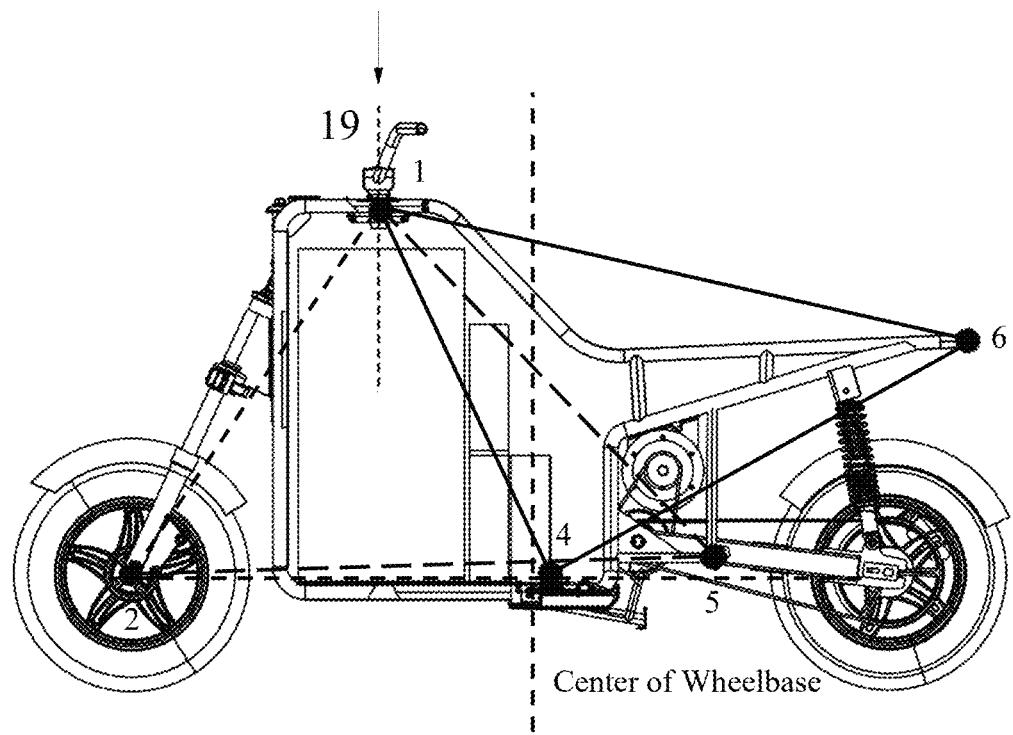
FIG. 12 illustrates two triangles for centres of gravity of the vehicle, where cargo hold chassis is ahead of battery support chassis, where there is cargo, battery, no rider, and no pillion.

FIG. 12 illustrates two triangles for centres of gravity of the vehicle, where cargo hold chassis is ahead of battery support chassis, where there is cargo, battery, no rider, and no pillion.

Here, the figure depicts a first combined centre of gravity for cargo and battery and a second centre of gravity for the remainder of the vehicle.

In at least an embodiment, the combined centre of gravity of the cargo hold chassis along with battery support chassis, when there is cargo loaded and battery loaded, with cargo in front of battery or with battery in front of cargo or battery below said cargo or battery above said cargo, is defined to be inside a cargo and battery triangle defined by co-ordinates at point 1, point 2, and point 5 of FIG. 12. Point 1 is defined as an intersection point of an imaginary line along the handlebar axis and a line parallel to the top member or a line tangential to handlebar mounting point. Point 2 is defined at the front axle. Point 5 is defined at the pillion footrest.

In at least an embodiment, the combined centre of gravity of the rider and pillion support chassis, when there is no rider and no pillion, is defined to be inside a rider and pillion triangle defined by co-ordinates at point 1, point 4, and point 6 of FIG. 12. Point 1 is defined as an intersection point of an imaginary line along the handlebar axis and a line parallel to the top member or a line tangential to handlebar mounting point. Point 4 is defined at the rider footrest. Point 6 is defined at the operatively rearward farthest point on the rider and pillion support chassis.

Figure 13:
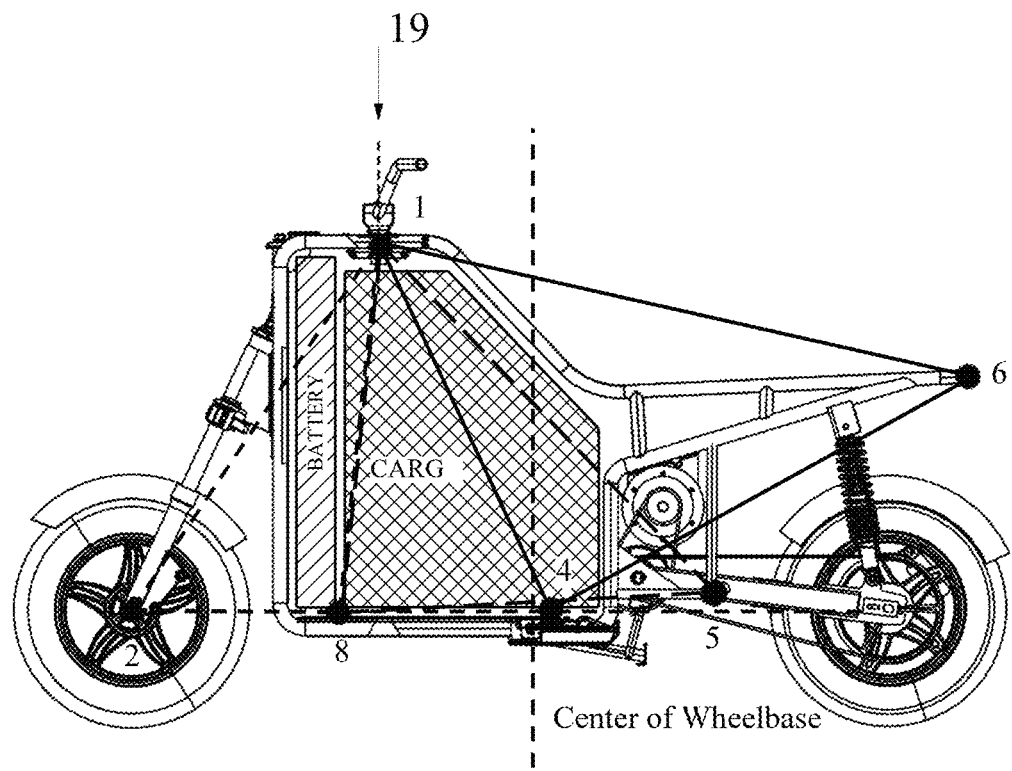
FIG. 13 illustrates individual centres of gravity of the vehicle when the vehicle has its battery support chassis in front of its cargo hold chassis and when the vehicle is loaded and has no rider and no pillion.

FIG. 13 illustrates individual centres of gravity of the vehicle when the vehicle has its battery support chassis in front of its cargo hold chassis and when the vehicle is loaded and has no rider and no pillion.

In at least an embodiment, the centre of gravity of the battery is defined to be inside a battery triangle defined by co-ordinates at point 1, point 2, and point 8 of FIG. 13. Point 1 is defined as an intersection point of an imaginary line along the handlebar axis and a line parallel to the top member or a line tangential to handlebar mounting point. Point 2 is defined at the front axle. Point 8 is defined at the farthest bottom point on the battery support chassis. In at least an embodiment, the centre of gravity of the cargo is defined to be inside a cargo triangle defined by co-ordinates at point 1, point 8, and point 5 of FIG. 13. Point 1 is defined as an intersection point of an imaginary line along the handlebar axis and a line parallel to the top member or a line tangential to handlebar mounting point. Point 8 is defined at the farthest bottom point on the battery support chassis. Point 5 is defined at the pillion footrest. In at least an embodiment, the centre of gravity of the rider and pillions support chassis, with no rider and no pillion, is defined to be inside a rider and pillion triangle defined by co-ordinates at point 1, point 4, and point 6 of FIG. 13. Point 1 is defined as an intersection point of an imaginary line along the handlebar axis and a line parallel to the top member or a line tangential to handlebar mounting point. Point 4 is defined at the rider footrest. Point 6 is defined at the operatively rearward farthest point on the rider and pillion support chassis.

Figure 14:
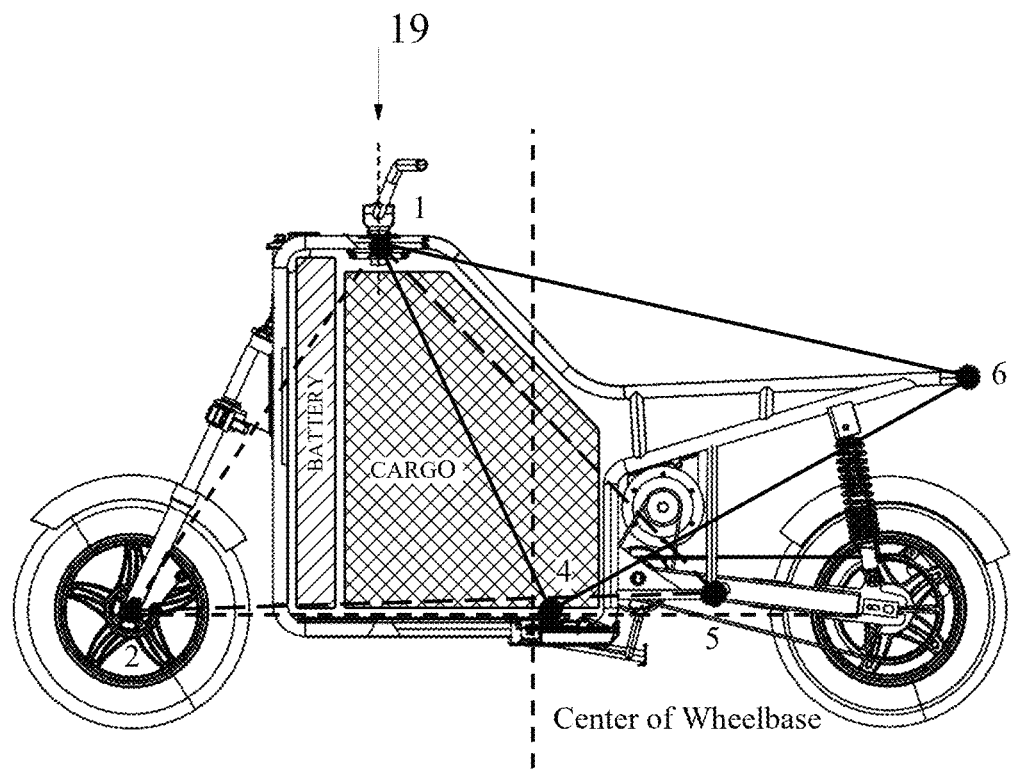
FIG. 14 illustrates combined centres of gravity of the vehicle when the vehicle has its battery support chassis in front of its cargo hold chassis and when the vehicle is loaded and has no rider and no pillion.

FIG. 14 illustrates combined centres of gravity of the vehicle when the vehicle has its battery support chassis in front of its cargo hold chassis and when the vehicle is loaded and has no rider and no pillion.

In at least an embodiment, the combined centre of gravity of cargo and battery, with cargo loaded and battery loaded, is defined to be inside a cargo and battery triangle defined by co-ordinates at point 1, point 2, and point 5 of FIG. 14. Point 1 is defined as an intersection point of an imaginary line along the handlebar axis and a line parallel to the top member or a line tangential to handlebar mounting point. Point 2 is defined at the front axle. Point 5 is defined at the pillion footrest.

In at least an embodiment, the centre of gravity of rider and pillion support chassis, with no rider and no pillion, is defined to be inside a rider and pillion triangle defined by co-ordinates at point 1, point 4, and point 6 of FIG. 14. Point 1 is defined as an intersection point of an imaginary line along the handlebar axis and a line parallel to the top member or a line tangential to handlebar mounting point. Point 4 is defined at the rider footrest. Point 6 is defined at the operatively rearward farthest point on the rider and pillion support chassis.

Figure 15:
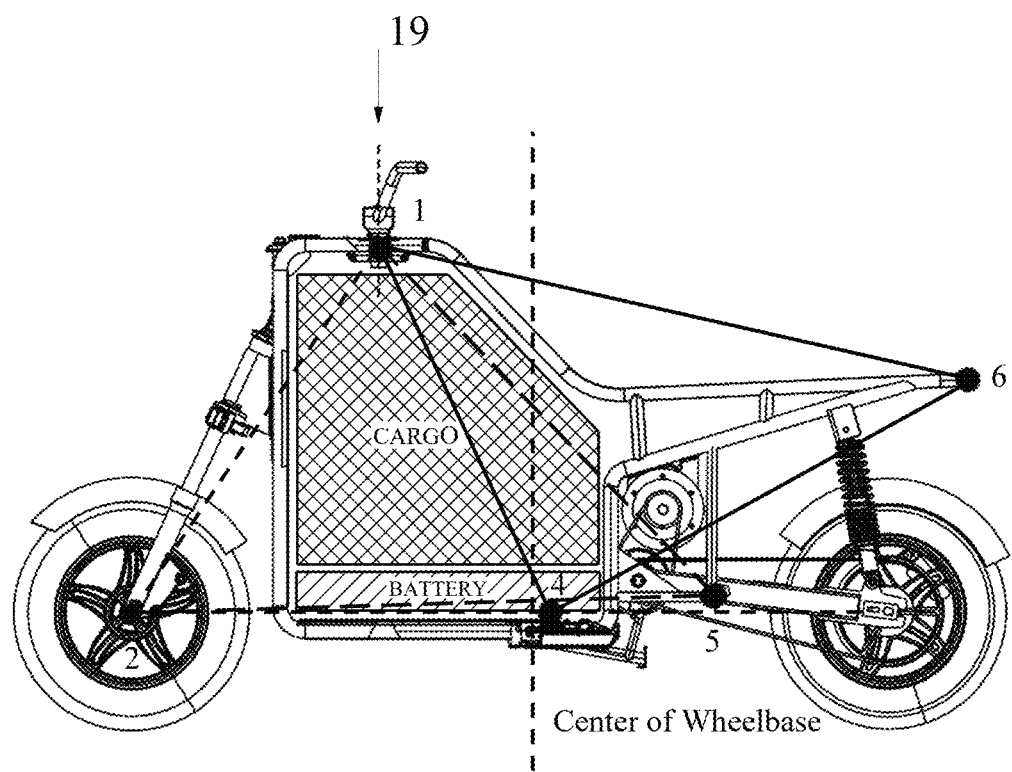
FIG. 15 illustrates combined centres of gravity of the vehicle when the vehicle has its battery support chassis below its cargo hold chassis and when the vehicle is loaded and has no rider and no pillion.

FIG. 15 illustrates combined centres of gravity of the vehicle when the vehicle has its battery support chassis below its cargo hold chassis and when the vehicle is loaded and has no rider and no pillion.

In at least an embodiment, the combined centre of gravity of cargo and battery, with cargo loaded and battery loaded, is defined to be inside a cargo and battery triangle defined by co-ordinates at point 1, point 2, and point 5 of FIG. 15. Point 1 is defined as an intersection point of an imaginary line along the handlebar axis and a line parallel to the top member or a line tangential to handlebar mounting point. Point 2 is defined at the front axle. Point 5 is defined at the pillion footrest.

In at least an embodiment, the centre of gravity of rider and pillion support chassis, with no rider and no pillion, is defined to be inside a rider and pillion triangle defined by co-ordinates at point 1, point 4, and point 6 of FIG. 15. Point 1 is defined as an intersection point of an imaginary line along the handlebar axis and a line parallel to the top member or a line tangential to handlebar mounting point. Point 4 is defined at the rider footrest. Point 6 is defined at the operatively rearward farthest point on the rider and pillion support chassis.

Figure 16:
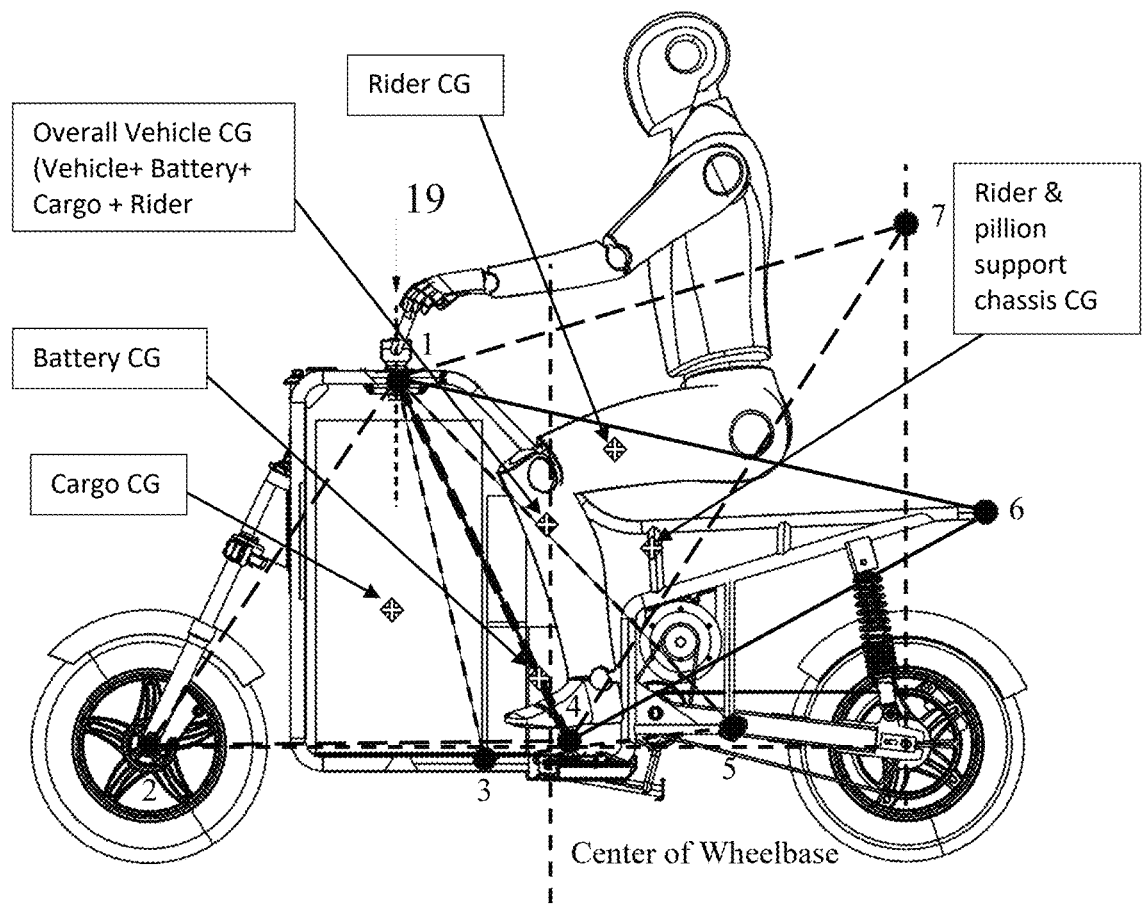
FIG. 16 illustrates individual centres of gravity of the vehicle when the vehicle is loaded with cargo placed in the cargo hold chassis, battery placed in the battery support chassis behind the cargo hold chassis, and where the vehicle also has a rider but no pillion.

FIG. 16 illustrates individual centres of gravity of the vehicle when the vehicle is loaded with cargo placed in the cargo hold chassis, battery placed in the battery support chassis behind the cargo hold chassis, and where the vehicle also has a rider but no pillion.

In at least an embodiment, the centre of gravity of the cargo is defined to be inside a cargo triangle defined by co-ordinates at point 1, point 2, and point 4 of FIG. 16. Point 1 is defined as an intersection point of an imaginary line along the handlebar axis and a line parallel to the top member or a line tangential to handlebar mounting point. Point 2 is defined at the front axle. Point 4 is defined at the rider footrest.

In at least an embodiment, the centre of gravity of the battery is defined to be inside a battery triangle defined by co-ordinates at point 1, point 3, and point 5 of FIG. 16. Point 1 is defined as an intersection point of an imaginary line along the handlebar axis and a line parallel to the top member or a line tangential to handlebar mounting point. Point 3 is defined at the bottom operatively rearward farthest point on the cargo hold chassis when the cargo hold chassis is operatively in front of the battery hold chassis. Point 5 is defined at the pillion footrest.

In at least an embodiment, the centre of gravity of the rider and pillion support chassis is defined to be inside a rider and pillion triangle defined by co-ordinates at point 1, point 4, and point 6 of FIG. 16. Point 1 is defined as an intersection point of an imaginary line along the handlebar axis and a line parallel to the top member or a line tangential to handlebar mounting point. Point 4 is defined at the rider footrest. Point 6 is defined at the operatively rearward farthest point on the rider and pillion support chassis.

In at least an embodiment, the centre of gravity of a rider on the rider and pillion support chassis is defined to be inside a rider triangle defined by co-ordinates at point 1, point 4, and point 7 of FIG. 16. Point 1 is defined as an intersection point of an imaginary line along the handlebar axis and a line parallel to the top member or a line tangential to handlebar mounting point. Point 4 is defined at the rider footrest. Point 7 is defined as a point of an imaginary line perpendicular to ground and passing through the rear axle, at a distance of not more 1300 mm upwards from the rear axle.

The cargo triangle balances the rider triangle, in terms of respective centres of gravity, thereby helping in mass centralization.

Dead cargo weight, in the cargo hold chassis, along with battery weight, in the battery support chassis, aids in improved handling by reducing height of centre of gravity of the combination of cargo triangle, battery triangle, and rider triangle.

Figure 17:
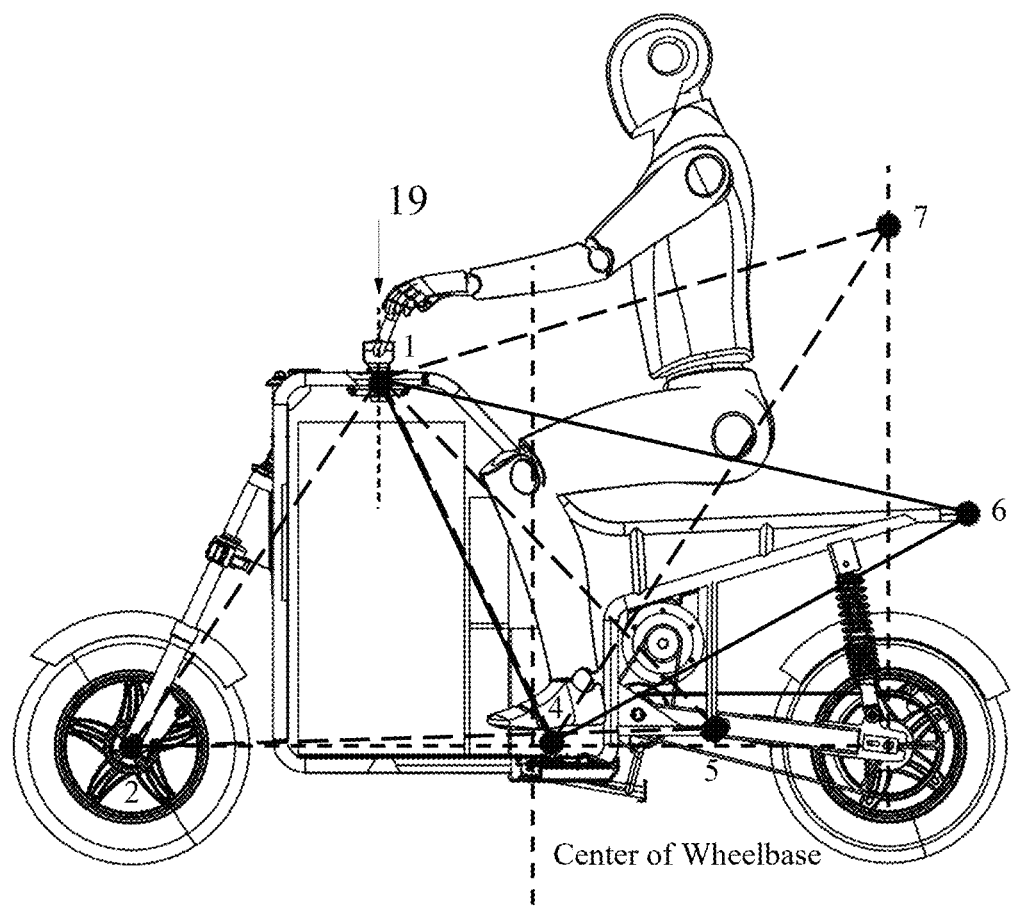
FIG. 17 illustrates combined centres of gravity of the vehicle when the vehicle is loaded with cargo placed in the cargo hold chassis, battery placed in the battery support chassis behind the cargo hold chassis, and where the vehicle also has a rider but no pillion.

FIG. 17 illustrates combined centres of gravity of the vehicle when the vehicle is loaded with cargo placed in the cargo hold chassis, battery placed in the battery support chassis behind the cargo hold chassis, and where the vehicle also has a rider but no pillion.

In at least an embodiment, the combined centre of gravity of the cargo in the cargo hold chassis and the battery in the battery support chassis is defined to be inside a cargo and battery triangle defined by co-ordinates at point 1, point 2, and point 5 of FIG. 17. Point 1 is defined as an intersection point of an imaginary line along the handlebar axis and a line parallel to the top member or a line tangential to handlebar mounting point. Point 2 is defined at the front axle. Point 5 is defined at the pillion footrest.

In at least an embodiment, the centre of gravity of the rider and pillion support chassis is defined to be inside a rider and pillion triangle defined by co-ordinates at point 1, point 4, and point 6 of FIG. 17. Point 1 is defined as an intersection point of an imaginary line along the handlebar axis and a line parallel to the top member or a line tangential to handlebar mounting point. Point 4 is defined at the rider footrest. Point 6 is defined at the operatively rearward farthest point on the rider and pillion support chassis.

In at least an embodiment, the centre of gravity of a rider on the rider and pillion support chassis is defined to be inside a rider triangle defined by co-ordinates at point 1, point 4, and point 7 of FIG. 17. Point 1 is defined as an intersection point of an imaginary line along the handlebar axis and a line parallel to the top member or a line tangential to handlebar mounting point. Point 4 is defined at the rider footrest. Point 7 is defined as a point of an imaginary line perpendicular to ground and passing through the rear axle, at a distance of not more 1300 mm upwards from the rear axle.

Figure 18:
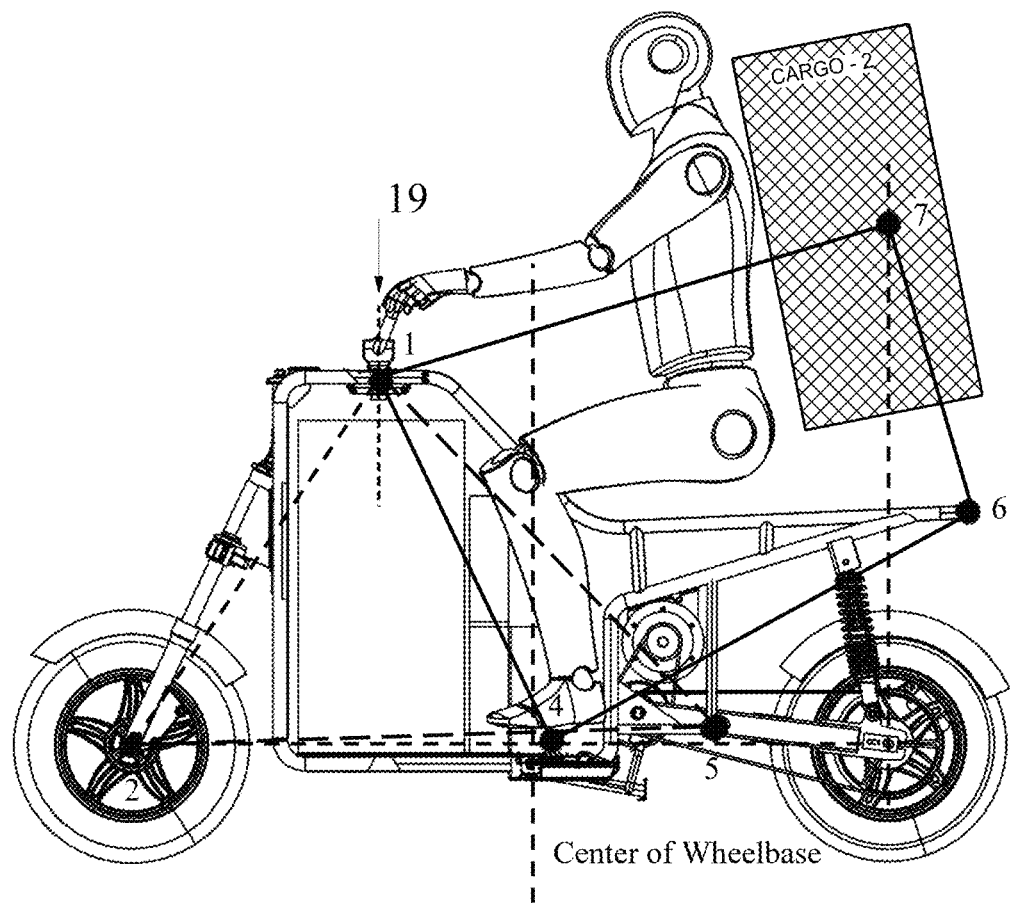
FIG. 18 illustrates combined centres of gravity of the vehicle when the vehicle is loaded with cargo placed in the cargo hold chassis, battery placed in the battery support chassis behind the cargo hold chassis, and where the vehicle also has a rider and cargo placed behind the rider on the rider and pillion support chassis instead of a pillion.

FIG. 18 illustrates combined centres of gravity of the vehicle when the vehicle is loaded with cargo placed in the cargo hold chassis, battery placed in the battery support chassis behind the cargo hold chassis, and where the vehicle also has a rider and cargo placed behind the rider on the rider and pillion support chassis instead of a pillion.

In at least an embodiment, the combined centre of gravity of the cargo in the cargo hold chassis and the battery in the battery support chassis is defined to be inside a cargo and battery triangle defined by co-ordinates at point 1, point 2, and point 5 of FIG. 18. Point 1 is defined as an intersection point of an imaginary line along the handlebar axis and a line parallel to the top member or a line tangential to handlebar mounting point. Point 2 is defined at the front axle. Point 5 is defined at the pillion footrest.

In at least an embodiment, the combined centre of gravity of the rider and cargo on the rider and pillion support is defined to be inside a rider and cargo quadrilateral defined by co-ordinates at point 1, point 4, point 6, and point 7 of FIG. 18. Point 1 is defined as an intersection point of an imaginary line along the handlebar axis and a line parallel to the top member or a line tangential to handlebar mounting point. Point 4 is defined at the rider footrest. Point 6 is defined at the operatively rearward farthest point on the rider and pillion support chassis. Point 7 is defined as a point of an imaginary line perpendicular to ground and passing through the rear axle, at a distance of not more 1300 mm upwards from the rear axle.

The cargo and battery triangle balances the rider and cargo quadrilateral, in terms of respective centres of gravity, thereby helping in mass centralization.

Dead cargo weight, in the cargo hold chassis, along with battery weight, in the battery support chassis, aids in improved handling by reducing height of centre of gravity of the combination of cargo triangle, battery triangle, and rider and cargo triangle.

Figure 19:
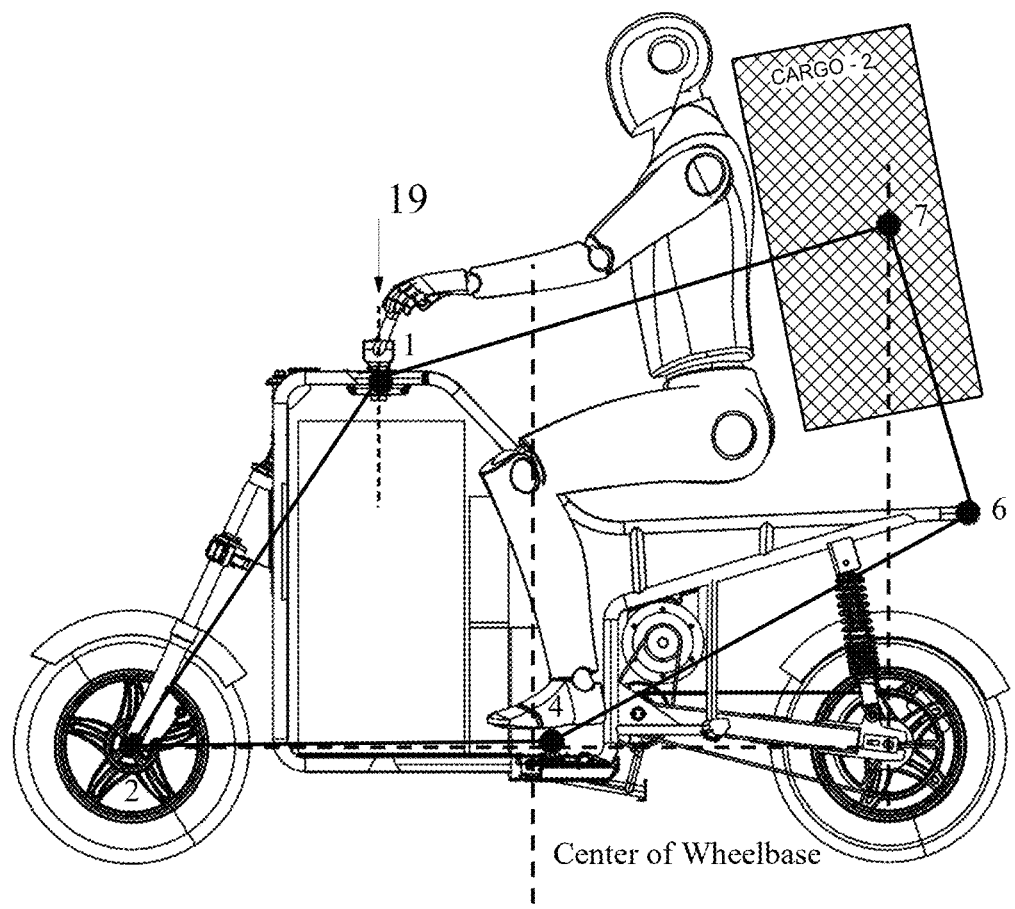
FIG. 19 illustrates a single combined centre of gravity of the vehicle when the vehicle is loaded with cargo placed in the cargo hold chassis, battery placed in the battery support chassis behind the cargo hold chassis, and where the vehicle also has a rider and cargo placed behind the rider on the rider and pillion support chassis instead of a pillion.

FIG. 19 illustrates a single combined centre of gravity of the vehicle when the vehicle is loaded with cargo placed in the cargo hold chassis, battery placed in the battery support chassis behind the cargo hold chassis, and where the vehicle also has a rider and cargo placed behind the rider on the rider and pillion support chassis instead of a pillion.

In at least an embodiment, the combined centre of gravity of the entire vehicle is defined to be inside a vehicle and rider polygon defined by co-ordinates at point 1, point 2, point 4, point 6, and point 7 of FIG. 19. Point 1 is defined as an intersection point of an imaginary line along the handlebar axis and a line parallel to the top member or a line tangential to handlebar mounting point. Point 2 is defined at the front axle. Point 4 is defined at the rider footrest. Point 6 is defined at the operatively rearward farthest point on the rider and pillion support chassis. Point 7 is defined as a point of an imaginary line perpendicular to ground and passing through the rear axle, at a distance of not more 1300 mm upwards from the rear axle.

Figure 20:
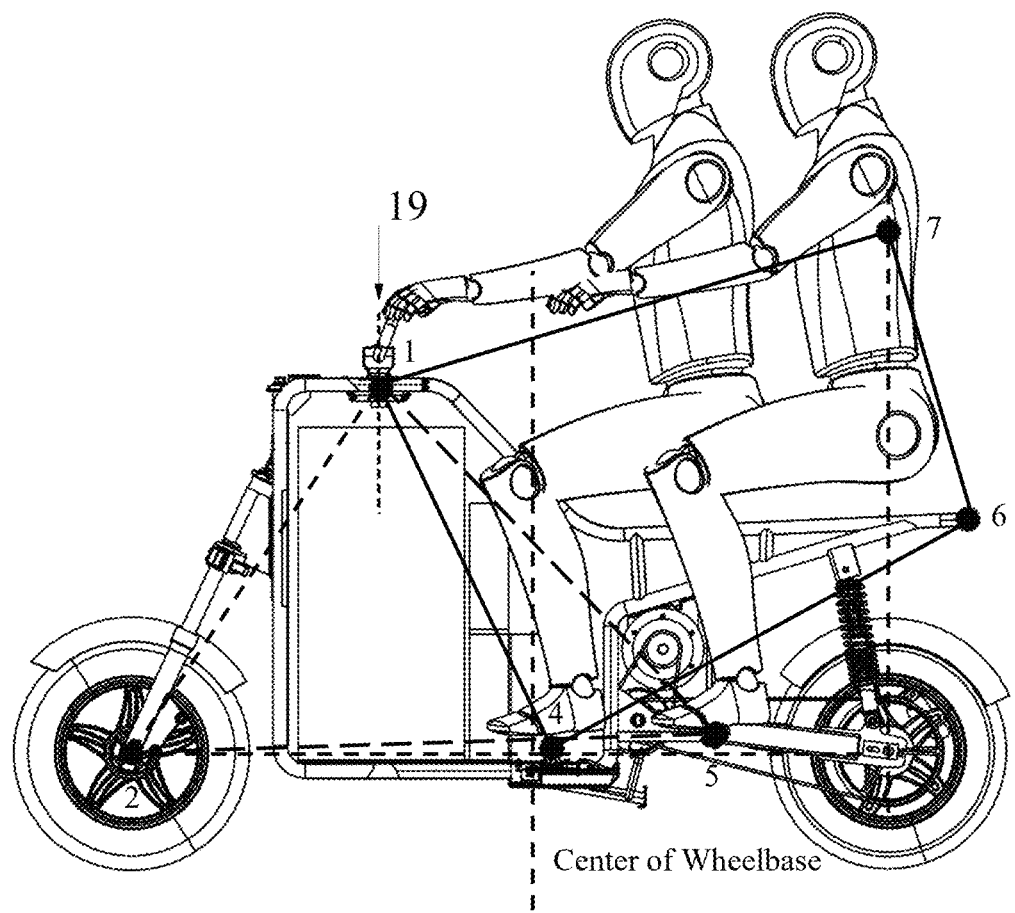
FIG. 20 illustrates combined centres of gravity of the vehicle when the vehicle is loaded with cargo placed in the cargo hold chassis, battery placed in the battery support chassis behind the cargo hold chassis, and where the vehicle also has a rider but a pillion on the rider and pillion support chassis.

FIG. 20 illustrates combined centres of gravity of the vehicle when the vehicle is loaded with cargo placed in the cargo hold chassis, battery placed in the battery support chassis behind the cargo hold chassis, and where the vehicle also has a rider but a pillion on the rider and pillion support chassis. In at least an embodiment, the combined centre of gravity of the cargo in the cargo hold chassis and the battery in the battery support chassis is defined to be inside a cargo and battery triangle defined by co-ordinates at point 1, point 2, and point 5 of FIG. 20. Point 1 is defined as an intersection point of an imaginary line along the handlebar axis and a line parallel to the top member or a line tangential to handlebar mounting point. Point 2 is defined at the front axle. Point 5 is defined at the pillion footrest.

In at least an embodiment, the combined centre of gravity of the rider and pillion on the rider and pillion support is defined to be inside a rider and pillion quadrilateral defined by co-ordinates at point 1, point 4, point 6, and point 7 of FIG. 20. Point 1 is defined as an intersection point of an imaginary line along the handlebar axis and a line parallel to the top member or a line tangential to handlebar mounting point. Point 4 is defined at the rider footrest. Point 6 is defined at the operatively rearward farthest point on the rider and pillion support chassis. Point 7 is defined as a point of an imaginary line perpendicular to ground and passing through the rear axle, at a distance of not more 1300 mm upwards from the rear axle.

The cargo and battery triangle balances the rider and pillion quadrilateral, in terms of respective centres of gravity, thereby helping in mass centralization.

Dead cargo weight, in the cargo hold chassis, along with battery weight, in the battery support chassis, aids in improved handling by reducing height of centre of gravity of the combination of cargo triangle, battery triangle, and rider and pillion triangle.

Figure 21:
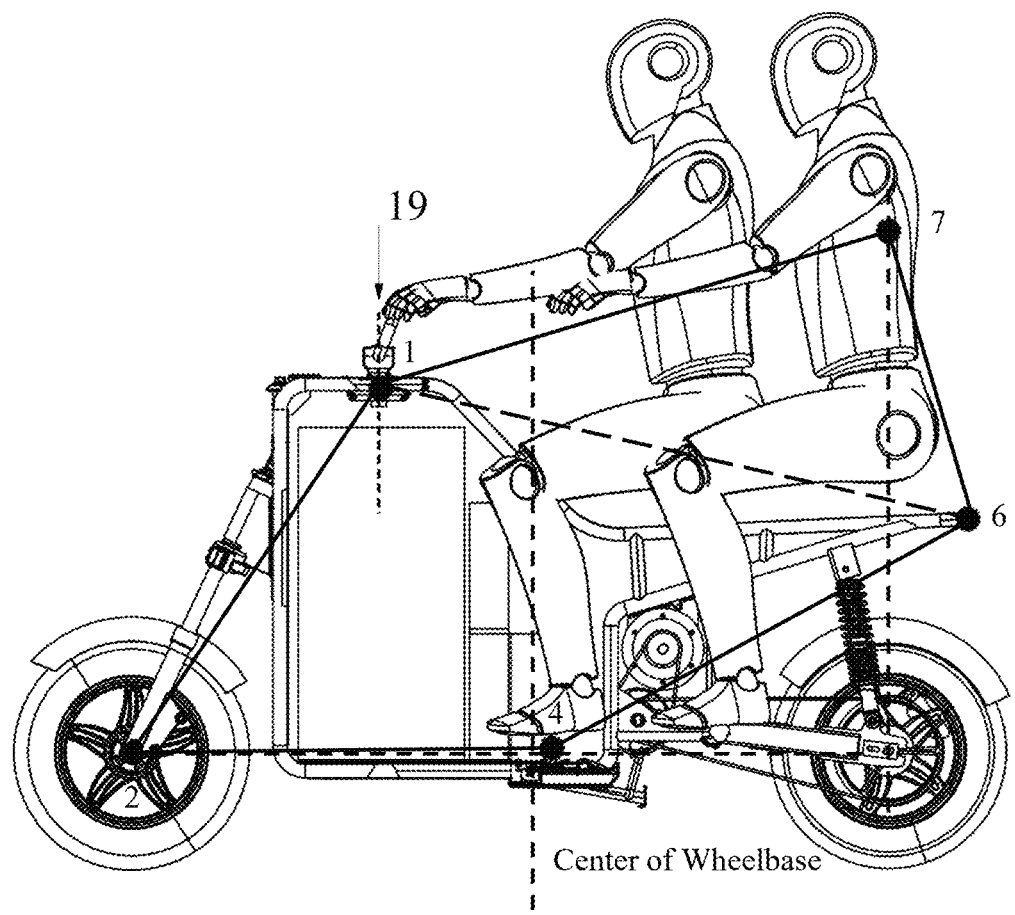
FIG. 21 illustrates single combined centre of gravity of the vehicle when the vehicle is loaded with cargo placed in the cargo hold chassis, battery placed in the battery support chassis behind the cargo hold chassis, and where the vehicle also has a rider and a pillion on the rider and pillion support chassis.

FIG. 21 illustrates single combined centre of gravity of the vehicle when the vehicle is loaded with cargo placed in the cargo hold chassis, battery placed in the battery support chassis behind the cargo hold chassis, and where the vehicle also has a rider and a pillion on the rider and pillion support chassis. In at least an embodiment, the combined centre of gravity of the entire vehicle is defined to be inside a vehicle, rider, and pillion rider polygon defined by co-ordinates at point 1, point 2, point 4, point 6, and point 7 of FIG. 20. Point 1 is defined as an intersection point of an imaginary line along the handlebar axis and a line parallel to the top member or a line tangential to handlebar mounting point. Point 2 is defined at the front axle. Point 4 is defined at the rider footrest. Point 6 is defined at the operatively rearward farthest point on the rider and pillion support chassis. Point 7 is defined as a point of an imaginary line perpendicular to ground and passing through the rear axle, at a distance of not more 1300 mm upwards from the rear axle.

Figure 22:
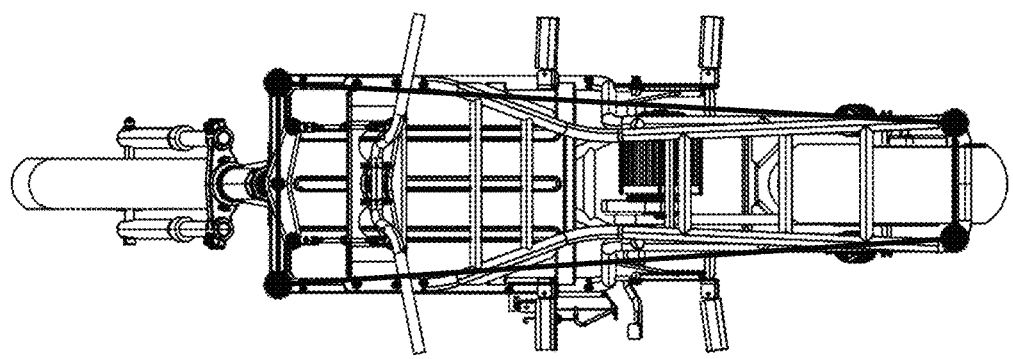
FIG. 22 illustrates a top view of the vehicle of this invention.

FIG. 22 illustrates a top view of the vehicle of this invention.

As seen in the top view, in at least an embodiment, a trapezoidal centre of gravity is defined, in that two points of the trapezoidal centre of gravity are on the front members of the cargo hold chassis and two points of the trapezoidal centre of gravity are on the rearmost part of the rider and pillion support chassis.

In at least an alternative or additional embodiment, the battery is located on any portion or member of any of the chassis based on requirement of weight distribution. In at least an embodiment, the battery is located in front of the cargo hold enclosure adjacent to the steering column allowing the front axle to be heavier. Addition of cargo, in the cargo hold enclosure, adds more load on the front axle, thereby shifting the centre of gravity towards the front axle. In another embodiment, the battery is located below the cargo hold enclosure. In yet another embodiment, the battery is located on the top member of the cargo support chassis. In still another embodiment, the battery is located on the back side of the cargo support chassis, below a rider seat on the rider and pillion support chassis. In yet another embodiment, a steering column is mounted on a battery pack on the operative front side which also acts as a stress member of the cargo hold chassis.

In at least an embodiment, the handlebar of this vehicle is located longitudinally spaced apart from the steering axis. Preferably, the steering mechanism is a four-bar linkage mechanism or a rack and pinion mechanism or a bevel gear mechanism. This steering mechanism is located operatively atop the cargo hold chassis (10) or atop the batter support chassis (30). Damping effect on the steering mechanism can be carried out by means of shimmy dampers—mechanical, pneumatic, magnetic, or hydraulic type.

In at least an embodiment, the steering mechanism is a steer-by-wire steering mechanism or a power steering mechanism. In at least an embodiment, the steering mechanism comprises sensors and motors. The sensors are located at the handlebar axis. The handlebar rotation about its axis is monitored by sensors, which reads the rotational degrees of movement and/or force on handlebar by the rider input. A motor is located in communication with the front wheel of this vehicle either directly driving the steering OR by use of Gearing. A controller monitors the rider inputs and provides inputs to the motor for turning the vehicle steering. Any handle movement is captured and replicated at the front wheel through this steering mechanism.

Figure 23:
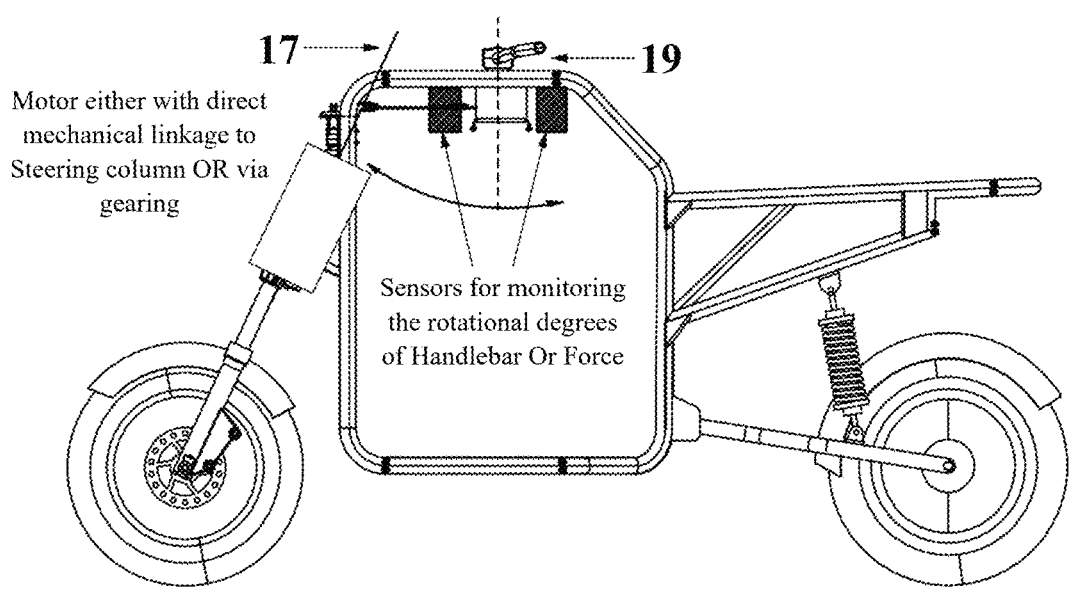
FIG. 23 illustrates a steering mechanism.

FIG. 23 illustrates a steering mechanism.

In at least an embodiment, the suspension mechanism of this vehicle is comprised of a group of suspensions selected from a front suspension, a rear suspension, a front and rear suspension, and its combinations. In one embodiment, the front suspension and steering column is mounted on the front side of the cargo hold chassis. In one embodiment, the cargo hold chassis comprises a front suspension which is relatively stiffer than the rear suspension. In an alternative embodiment, the cargo hold chassis comprises a rear suspension which is relatively stiffer than the front suspension. In one embodiment, the cargo hold chassis is communicably coupled with a front suspension. In one embodiment, the rider and pillion support chassis is communicably coupled with a rear suspension.

In at least an embodiment, the cargo hold chassis is an intelligent chassis comprising sensors configured to read tags located on cargo whilst they are being placed and whilst they are being removed. The sensors (providing delivery address details), coupled with a database, and a processing engine defined by a rule engine, and local traffic data and such parameters determines an optimum route for a rider for cargo or portions thereof to be delivered. Other data of the vehicle such as battery life, time of day, fuel, rider preferences, and the like can also be used to determine an optimum or rider-specific ride. In at least an embodiment, this chassis comprises load cells which communicate with a vehicle controller/processor in order to determine speed of the vehicle based on the loading inside the cargo hold space. It may also consider other parameters such as maximize the range for the given battery capacity, remaining charge, life of the battery, and the like. Further, data from the load cells may also aid in determining starting torque.

It is an object of the invention that the centre of gravity of the rider and centre of gravity of the cargo be maintained in the defined triangles/quadrilaterals/polygons on the frame in order to maintain the balance of this vehicle. In the prior art, there was no provision and defined centre of gravity location for a combination of rider, pillion, and cargo.

The TECHNICAL ADVANCEMENT of this invention lies in providing a cargo-carrying wheeled vehicle comprised of a cargo hold chassis and rider and pillion support chassis wherein, addition of cargo and a rider along with pillion actively assist in maintaining the centre of gravity of the vehicle, especially after addition of cargo and rider along with pillion, relatively lower (closer to ground) and substantially on or very near to the centerline of the wheelbase of this vehicle.

While this detailed description has disclosed certain specific embodiments for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

What is claimed is:

1. A cargo-carrying wheeled vehicle comprising:
at least a cargo hold chassis;
at least a battery support chassis configured to be operatively behind or operatively ahead or operatively underneath or operatively integral with said cargo hold chassis; and
at least a rider and pillion support chassis configured to be operatively behind said battery support chassis and operatively behind said cargo hold chassis, the rider and pillion support chassis comprises a structural framework having:
an operative top support member extending from the cargo hold chassis, the operative top support member having a joint portion, and an end portion extending beyond the joint portion, and
an operative bottom support member extending taperedly from the joint portion of the operative top support member and coupled to the cargo hold chassis to hold the rider and the pillion on the operative top support member;
a swing arm extending between the cargo hold chassis and a rear axle;
a rear suspension directedly coupled to the operative bottom support member and extending therefrom to be directly connected to the rear axle, and, the operative top support member of said rider and pillion support chassis is located at up to a height of 800 mm vertically away from the rear axle;

a rider footrest extending transversally from said vehicle, and being positioned at a distance from a centre of said wheelbase with a tolerance range of one-third said wheelbase added to or subtracted from said centre of said wheelbase;

a pillion footrest arrangement comprising:
  at least one of:
    a vertical member extending downwardly from the operative bottom support member up to an end point, and
    a horizontal member extending horizontally from the cargo hold chassis up to the end point,
  a pillion footrest extending transversally from the end point of the at least one of the vertical member and the horizontal member to be positioned between the rider footrest and a rear wheel.

2. The vehicle as claimed in claim 1 wherein, a front wheel or a front set of wheels are communicably coupled to said cargo hold chassis or said battery support chassis based on whichever is operatively placed ahead or adjacent, said front wheel being located on a front axle communicably coupled to a steering mechanism.

3. The vehicle as claimed in claim 1 wherein,
said cargo hold chassis being located operatively forward and operatively lower with respect to said rider and pillion support chassis; and
said cargo hold chassis comprises a structural framework with at least a lateral support member along with the operative top support member and an operative bottom support member to form a contoured space to hold cargo.

4. The vehicle as claimed in claim 1 wherein, said cargo hold chassis or said battery support chassis is communicably coupled with the rear wheel or a rear set of wheels, the rear wheel is located on the rear axle.

5. The vehicle as claimed in claim 1 wherein, said cargo hold chassis or said battery hold chassis comprises a swing arm pivot for mounting the swing arm and at least one mounting location for suspension mounts, whichever is adjacent to the rider and pillion support chassis.

6. The vehicle as claimed in claim 1 wherein, a top member of said cargo hold chassis or a top member of said battery support chassis is an extension from a steering column, and the top member of said cargo hold chassis or the top member of said battery support chassis are not connected to a rear lateral column of said cargo hold chassis or from a rear lateral column of said battery support chassis, thereby keeping said cargo hold chassis or said battery support chassis open and providing an open cargo hold chassis or an open battery support chassis.

7. The vehicle as claimed in claim 1 wherein, a top member of said cargo hold chassis or a top member of said battery support chassis is an extension from a rear lateral column of said cargo hold chassis or from a rear lateral column of said battery support chassis and the top member of said cargo hold chassis or the top member of said battery support chassis are not connected to a front lateral column of said cargo hold chassis or a front lateral column of said battery support chassis, thereby keeping said cargo hold chassis or said battery support chassis open, and providing an open cargo hold chassis or an open battery support chassis.

8. The vehicle as claimed in claim 1 wherein, an operative front wheel of said vehicle is smaller than an operative rear wheel of said vehicle, thereby making said cargo hold chassis and said battery support chassis forward bias, thereby increasing weight on said front wheel when cargo and battery is loaded onto said cargo hold chassis and said battery support chassis which is counterbalanced by load of the rider and pillion, thereby helping in mass centralization.

9. The vehicle as claimed in claim 1 wherein, said vehicle comprises a handlebar axis longitudinally in line and/or parallel with a steering axis and is located on top of said cargo hold chassis or Battery hold chassis, and
at least a battery being located at a location selected from any location in said cargo hold chassis or said battery hold chassis or said rider and pillion support chassis, and its combinations.

10. A cargo-carrying wheeled vehicle comprising:
at least a cargo hold chassis;
at least an integrated battery and rider-pillion support chassis configured to be operatively behind said cargo hold chassis (10);
wherein,
  the rider-pillion support chassis comprises a structural framework having:
    an operative top support member extending from the cargo hold chassis, the operative top support member having a joint portion, and an end portion extending beyond the joint portion, and
    an operative bottom support member extending taperedly from the joint portion of the operative top support member and coupled to the cargo hold chassis to hold the rider and the pillion on the operative top support member;
  a swing arm extending between the cargo hold chassis and a rear axle;
  a rear suspension directedly coupled to the operative bottom support member and extending therefrom to be directly connected to the rear axle, and, the operative top support member of said rider and pillion support chassis is located at up to a height of 800 mm vertically away from the rear axle;
  a rider footrest extending transversally from said vehicle, and being positioned at a distance from a centre of said wheelbase with a tolerance range of one-third said wheelbase added to or subtracted from said centre of said wheelbase;
  a pillion footrest arrangement comprising:
    at least one of:
      a vertical member extending downwardly from the operative bottom support member up to an end point, and
      a horizontal member extending horizontally from the cargo hold chassis up to the end point,
    a pillion footrest extending transversally from the end point of the at least one of the vertical member and the horizontal member to be positioned between the rider footrest and a rear wheel.

11. A cargo-carrying wheeled vehicle comprising:
at least a cargo hold, battery, and rider and pillion support chassis with cargo hold placed operatively ahead of said rider and pillion chassis, in that, at least a battery being located at a location selected from any location in said cargo hold, any location beneath said rider and pillion, and its combinations, wherein, a cumulative centre of gravity of said cargo hold and said battery being defined by an integrated cumulative cargo—battery quadrilateral defined by a first point, a second point, a fourth point, and a sixth point, in that, said first point being defined as an intersection point of an imaginary line along a handlebar axis and a line parallel to the top member or a line tangential to handlebar mounting point, said second point being defined at a front axle, said fourth point being defined at a rider footrest, and said sixth point being defined at an operatively rearward farthest point on the rider and pillion support chassis, wherein, the rider-pillion support chassis comprises a structural framework having:
- an operative top support member extending from the cargo hold chassis, the operative top support member having a joint portion, and an end portion extending beyond the joint portion, and
- an operative bottom support member extending taperedly from the joint portion of the operative top support member and coupled to the cargo hold chassis to hold the rider and the pillion on the operative top support member;

a swing arm extending between the cargo hold chassis and a rear axle;

a rear suspension directedly coupled to the operative bottom support member and extending therefrom to be directly connected to the rear axle, and, the operative top support member of said rider and pillion support chassis is located at up to a height of 800 mm vertically away from the rear axle;

a rider footrest extending transversally from said vehicle, and being positioned at a distance from a centre of said wheelbase with a tolerance range of one-third said wheelbase added to or subtracted from said centre of said wheelbase;

a pillion footrest arrangement comprising:
at least one of:
- a vertical member extending downwardly from the operative bottom support member up to an end point, and
- a horizontal member extending horizontally from the cargo hold chassis up to the end point, a pillion footrest extending transversally from the end point of the at least one of the vertical members and the horizontal member to be positioned between the rider footrest and a rear wheel.

12. A cargo-carrying wheeled vehicle as claimed in claim 1 further comprising: a handlebar disposed on the top of the cargo hold chassis, wherein the handlebar having a handlebar axis located ahead of the centreline of a wheelbase.

* * * * *